US012562895B2

(12) United States Patent
Collinge et al.

(10) Patent No.: US 12,562,895 B2
(45) Date of Patent: Feb. 24, 2026

(54) DATA MANAGEMENT AND ENCRYPTION IN A DISTRIBUTED COMPUTING SYSTEM

(71) Applicant: MASTERCARD INTERNATIONAL INCORPORATED, Purchase, NY (US)

(72) Inventors: Mehdi Collinge, Hainaut (BE); Alan Johnson, Maldon (GB); Omar Laazimani, London (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 226 days.

(21) Appl. No.: 18/042,961

(22) PCT Filed: Jul. 22, 2021

(86) PCT No.: PCT/US2021/042739
§ 371 (c)(1),
(2) Date: Feb. 24, 2023

(87) PCT Pub. No.: WO2022/046330
PCT Pub. Date: Mar. 3, 2022

(65) Prior Publication Data
US 2023/0327863 A1 Oct. 12, 2023

(30) Foreign Application Priority Data
Aug. 26, 2020 (GB) ..................................... 2013340

(51) Int. Cl.
H04L 9/08 (2006.01)
H04L 9/06 (2006.01)
(Continued)

(52) U.S. Cl.
CPC .......... H04L 9/0861 (2013.01); H04L 9/0618 (2013.01); H04L 9/14 (2013.01);
(Continued)

(58) Field of Classification Search
CPC . G06Q 20/401; G06Q 20/3823; G06Q 20/382
See application file for complete search history.

(56) References Cited

U.S. PATENT DOCUMENTS

| | | | |
|---|---|---|---|
| 5,809,144 | A | 9/1998 | Sirbu |
| 7,558,953 | B2 | 7/2009 | Osthoff |

(Continued)

FOREIGN PATENT DOCUMENTS

| | | |
|---|---|---|
| CN | 1615463 A | 5/2005 |
| CN | 108432180 A | 8/2018 |

(Continued)

*Primary Examiner* — Barbara B Anyan
(74) *Attorney, Agent, or Firm* — Jordan IP Law, LLC

(57) ABSTRACT

A method of providing a secure service at a computing node is described. The secure service is for a requesting party external to the computing node. The following steps take place at the computing node. A service request is received from the requesting party. This service request comprises a request to generate a credential. The credential is then generated, and service-related information is obtained. The credential and the service-related information are encrypted using an encryption process to form an encrypted message part. A service-identifying clear message part is also created, and a message is sent comprising the clear message part and the encrypted message part to the requesting party. Methods of using such a message to validate the credential, and of using such a message to confirm the integrity of service-related information held in the message, are also described, as is computing apparatus adapted to carry out one or more of these methods.

20 Claims, 26 Drawing Sheets

(51) Int. Cl.
  H04L 9/14 (2006.01)
  H04L 9/32 (2006.01)
  *G06Q 20/38* (2012.01)
  *G06Q 20/40* (2012.01)

(52) U.S. Cl.
  CPC ....... H04L 9/3242 (2013.01); *G06Q 20/3823* (2013.01); *G06Q 20/401* (2013.01)

(56) References Cited

U.S. PATENT DOCUMENTS

| | | | | |
|---|---|---|---|---|
| 7,581,094 | B1 | 8/2009 | Apostolopoulos | |
| 8,463,855 | B2 * | 6/2013 | Adams ................ | G06Q 10/107 709/236 |
| 2003/0079143 | A1 | 4/2003 | Mikel et al. | |
| 2004/0078571 | A1 | 4/2004 | Haverinen | |
| 2009/0183003 | A1 | 7/2009 | Haverinen | |
| 2010/0161984 | A1 | 6/2010 | Pauker et al. | |
| 2015/0095219 | A1 * | 4/2015 | Hurley ................ | G06Q 20/382 705/39 |
| 2015/0161345 | A1 | 6/2015 | Tippett | |
| 2015/0332262 | A1 * | 11/2015 | Lingappa ........... | G06Q 20/3823 705/71 |
| 2017/0103388 | A1 * | 4/2017 | Pillai .................. | G06Q 20/3823 |
| 2017/0141926 | A1 | 5/2017 | Xu et al. | |
| 2017/0221055 | A1 | 8/2017 | Carlsson et al. | |
| 2019/0272543 | A1 * | 9/2019 | Ozvat .................. | G06Q 20/401 |
| 2023/0153800 | A1 * | 5/2023 | Lobato ............... | G06Q 20/3823 705/76 |

FOREIGN PATENT DOCUMENTS

| | | |
|---|---|---|
| CN | 108604338 A | 9/2018 |
| EP | 1329789 A1 | 7/2003 |
| EP | 3748526 A1 | 12/2020 |
| WO | 2013116515 A1 | 8/2013 |
| WO | 2018041350 A1 | 3/2018 |
| WO | 2020072626 A1 | 4/2020 |

* cited by examiner

FIG. 6

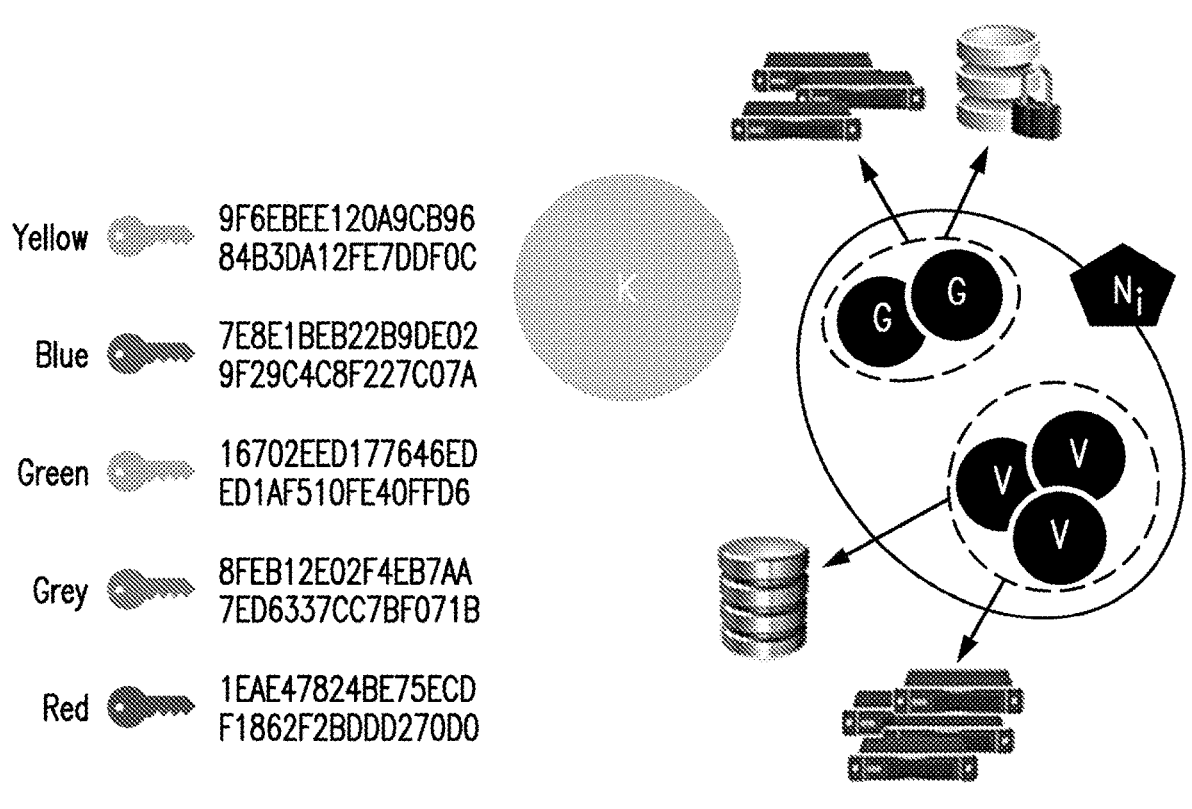
Yellow   9F6EBEE120A9CB96
84B3DA12FE7DDF0C
Blue   7E8E1BEB22B9DE02
9F29C4C8F227C07A
Green   16702EED177646ED
ED1AF510FE40FFD6
Grey   8FEB12E02F4EB7AA
7ED6337CC7BF071B
Red   1EAE47824BE75ECD
F1862F2BDDD270D0
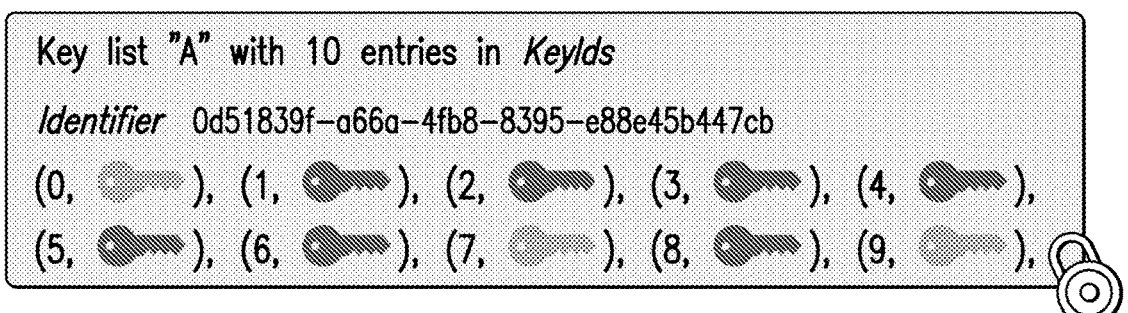
Key list "A" with 10 entries in *KeyIds*
*Identifier* 0d51839f-a66a-4fb8-8395-e88e45b447cb
(0,   ), (1,   ), (2,   ), (3,   ), (4,   ),
(5,   ), (6,   ), (7,   ), (8,   ), (9,   ),
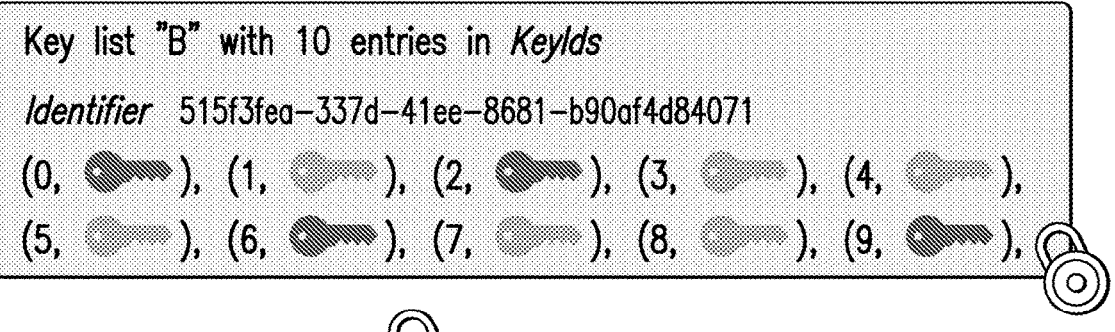
Key list "B" with 10 entries in *KeyIds*
*Identifier* 515f3fea-337d-41ee-8681-b90af4d84071
(0,   ), (1,   ), (2,   ), (3,   ), (4,   ),
(5,   ), (6,   ), (7,   ), (8,   ), (9,   ),
= Seal
FIG. 13

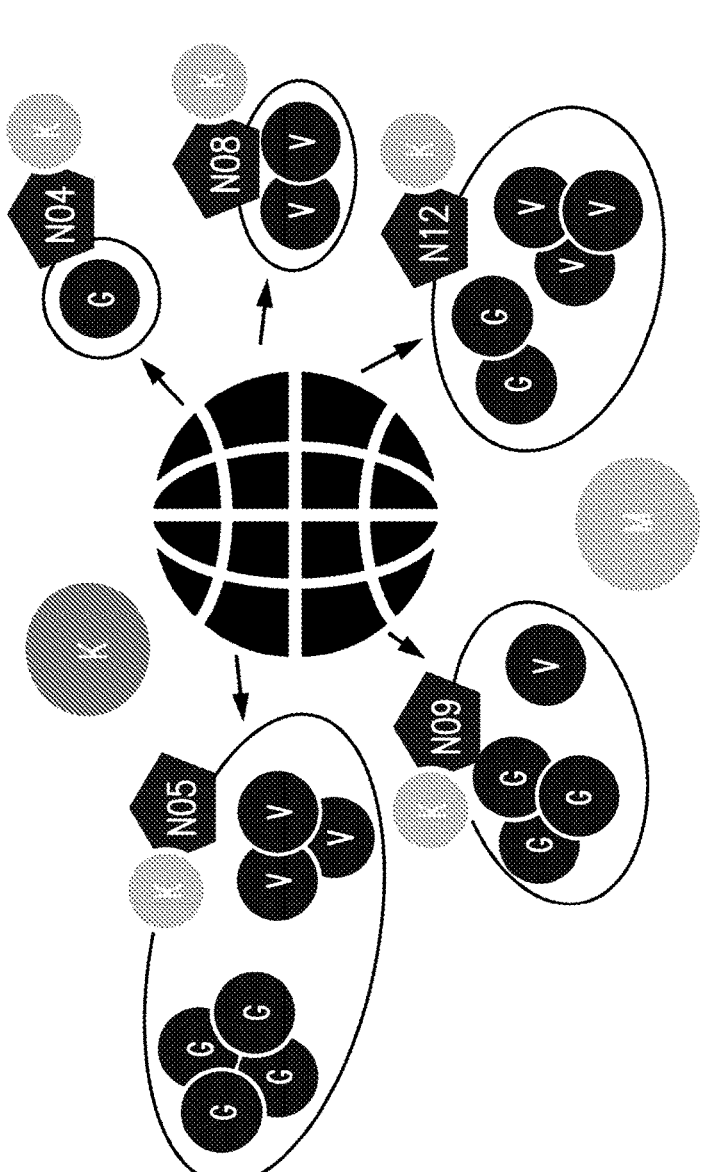
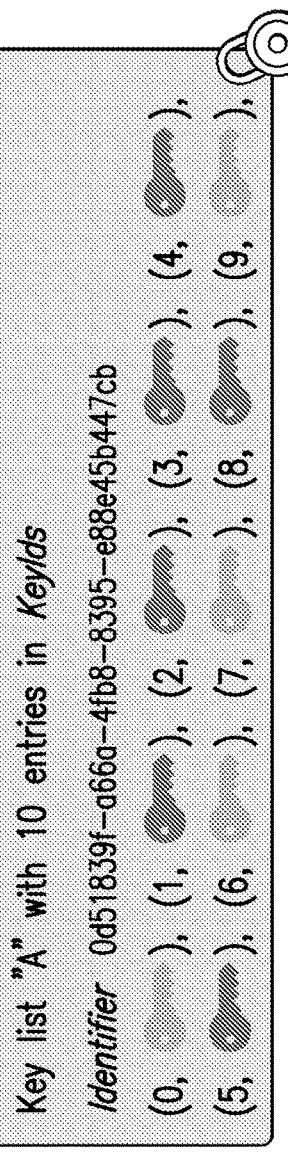
FIG. 16

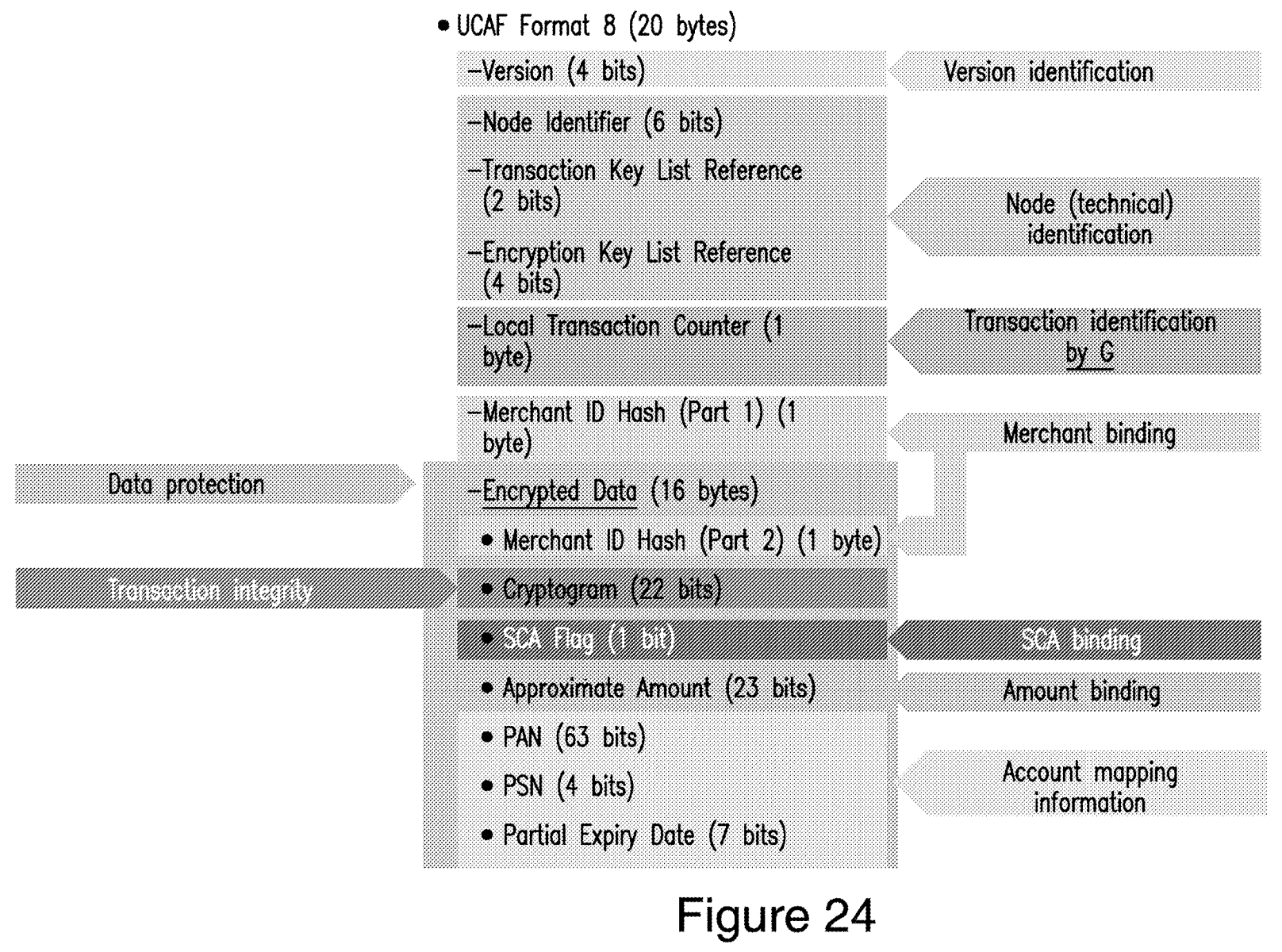

Version identification

Node (technical) identification

Transaction identification by G

Merchant binding

S&A binding

Amount binding

Account mapping information

- UCAF Format 8 (20 bytes)
  - Version (4 bits)
  - Node Identifier (6 bits)
  - Transaction Key List Reference (2 bits)
  - Encryption Key List Reference (4 bits)
  - Local Transaction Counter (1 byte)
  - Merchant ID Hash (Part 1) (1 byte)
  - Encrypted Data (16 bytes)
    - Merchant ID Hash (Part 2) (1 byte)
    - Cryptogram (22 bits)
    - S&A Flag (1 bit)
    - Approximate Amount (23 bits)
    - PAN (63 bits)
    - PSN (4 bits)
    - Partial Expiry Date (7 bits)

Data protection

Transaction integrity

Figure 24

DATA MANAGEMENT AND ENCRYPTION IN A DISTRIBUTED COMPUTING SYSTEM

CROSS-REFERENCE TO RELATED APPLICATIONS

The present application claims priority to International Patent Application No. PCT/US2021/042739 (filed on Jul. 22, 2021), which claims priority to GB Application No. 2013340.1 (filed Aug. 26, 2020), all of which is hereby incorporated by reference in its entirety.

FIELD OF DISCLOSURE

The present disclosure relates to data management and encryption in a distributed computing system, in particular, a distributed computing system performing one or more secure processes.

BACKGROUND TO DISCLOSURE

There are multiple technical challenges with requiring a centralized system to provide services to an exceptionally large number of clients, particularly when these are widely geographically distributed. It is logical to consider distributing the system so that the relevant services can be provided by a set of geographically distributed servers, rather than one central server or data centre.

In practice, such decentralisation may use a cloud architecture, which will typically use a number of geographically distributed servers—or data centres—to deliver services to clients. The cloud architecture may be considered as comprising a number of nodes—when using a cloud architecture, a node may be an aggregation of a number of computers and may cover more than one data centre with "real-time" connectivity and data sharing within a given node.

Decentralisation may itself be problematic, particularly if it is necessary for services to be provided in such a way that provision of the service has consequences beyond the server providing the service and the client receiving it. If, for example, other clients (or other system nodes) need to refer back to the service providing node to check on whether, or how, the service has been provided, or if it is necessary for a central system to have knowledge of how the service has been provided or of expected operation of the distributed server node, then new bottlenecks may appear in place of the former bottleneck at the central server, the overall quantity of messaging in the system may increase, and network latency can become a serious issue.

This is particular serious when the service relates to security (so it is necessary to be confident that it has been securely performed across the whole system) and when it relates to provision of a service over a short time frame. Both issues apply to transaction systems—it is necessary for transactions to be authorised over short time periods, and it is necessary to ensure that they have been performed legitimately—but apply to other technical contexts as well.

Services such as transaction authorisation may be required over a short timeframe, but it may also be necessary to hold data relating to service instances securely and reliably further into the future. Secure storage of service instance records will prove extremely onerous if there are an exceptionally large number of service instances. It would be desirable to address this issue in such a way that past service instances could be identified and data related to the service instances used to support future service activities, all in a way that maintained data security without an excessive demand on system resources.

SUMMARY OF DISCLOSURE

In a first aspect, the disclosure provides a method of providing a secure service at a computing node for a requesting party external to the computing node, the method comprising at the computing node: receiving a service request from a requesting party, wherein the service request comprises a request to generate a credential; generating the credential; obtaining service-related information, and encrypting the credential and the service-related information using an encryption process to form an encrypted message part; creating a service-identifying clear message part; and sending a message comprising the clear message part and the encrypted message part to the requesting party.

This encryption process may comprise a block cipher.

The credential may itself be generated using a cryptographic process. In this case, a shared mechanism may be used for providing keys for the first encryption process and the cryptographic process. A key validity period for keys for the encryption process may then be longer than a key validity period for keys for the cryptographic process. The cryptographic process may then comprise a keyed-hash algorithm. A suitable pair of algorithms may then be chosen for these two processes: for example, the encryption process and the cryptographic process may comprise SM4 and SM3 algorithms respectively. More generally, encryption may use any of a wide range of ciphers (such as AES CBC, SM4 CBC) and the cryptographic process a wide range of keyed-hash message authentication codes (such as HMAC-SHA256, HMAC-SM3, or any other process suitable for generating a message authentication code or a signature).

The secure service may comprise providing a credential for a transaction to allow the transaction to be authorised if the credential is validated. The unencrypted message part may then comprise information to identify the transaction—it may also comprise information to indicate how the transaction should be processed. The encrypted message part may comprise transaction data as well as the credential. This transaction data may comprise account data and transaction details, wherein the transaction details are adapted for checking the validity of account data independently of validation of the credential. This account data may comprise at least a primary account number and an indication of an expiry date. These transaction details may comprise one or more of a merchant identifier, a transaction amount, and a strong customer authentication flag.

In a second aspect, the disclosure provides a method of providing a secure service at a computing node for a requesting party external to the computing node, the method comprising at the computing node: receiving a service request from a requesting party, wherein the service request comprises a request to validate a credential, wherein the service request comprises a message comprising the credential, wherein the message comprises a clear message part comprising service-identifying information and an encrypted part comprising the credential and service-related information; using the service-identifying information to perform a decryption process to decrypt the encrypted part of the message; and further using the service-identifying information to validate the credential.

This decryption process may comprise a block cipher. The credential may be generated using a cryptographic process, and this cryptographic process may comprise a hashing algorithm.

The secure service may comprise validating a credential for a transaction to allow the transaction to be authorised. The unencrypted message part may comprise information to identify the transaction—it may also comprise information indicating how to process the transaction. The encrypted message part may comprise transaction data as well as the credential.

In a third aspect, the disclosure provides a method of providing a secure service at a computing node for a requesting party external to the computing node, the method comprising at the computing node: receiving a service request from a requesting party, wherein the service request comprises a request to confirm integrity of service-related information, wherein the message comprises a clear message part comprising service-identifying information and an encrypted part comprising service-related information; using the service-identifying information to perform a decryption process to decrypt the encrypted part of the message to provide the service-related information; and further using a first part of the service-related information to confirm the integrity of a second part of the service-related information, wherein the first part of the service-related information is provided in the service request.

This decryption process may comprise a block cipher. The encrypted part may further comprise a credential.

The secure service may comprise providing transaction-related data to a party entitled to receive the transaction-related data. The unencrypted message part may comprise information to identify the transaction—it may also comprise information indicating how to process the transaction. The encrypted message part may comprise transaction data. This transaction data may comprise account data and transaction details, wherein the transaction details are adapted for checking the validity of account data. The account data may then comprise at least a primary account number and an indication of an expiry date. The transaction details may then comprise one or more of a merchant identifier, a transaction amount, and a strong customer authentication flag.

In a fourth aspect, the disclosure provides computing apparatus comprising a processor and a memory and adapted to send and receive messages, wherein the processor is programmed to carry out the method of the first aspect, the second aspect, or the third aspect of the disclosure, or any combination thereof, with the assistance of the memory.

DESCRIPTION OF SPECIFIC EMBODIMENTS

Specific embodiments of the disclosure are now described, by way of example, with reference to the accompanying drawings, of which:

FIG. 6 illustrates elements of a complex distributed system adapted to implement the transaction architecture of FIG. 5;

Figure 9:
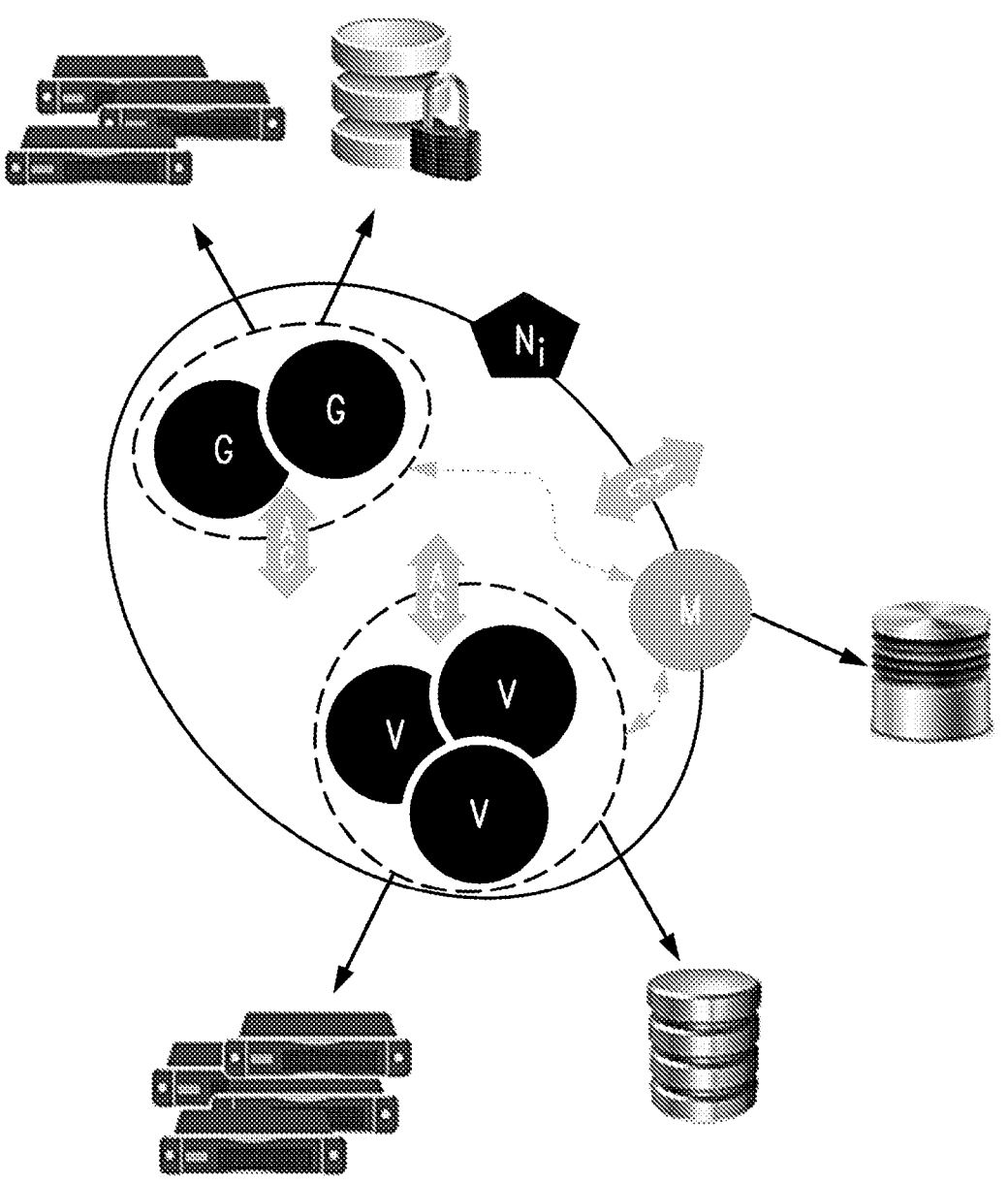
FIG. 9 illustrates a computing node of the arrangement of FIG. 8 in more detail.
Figure 10:
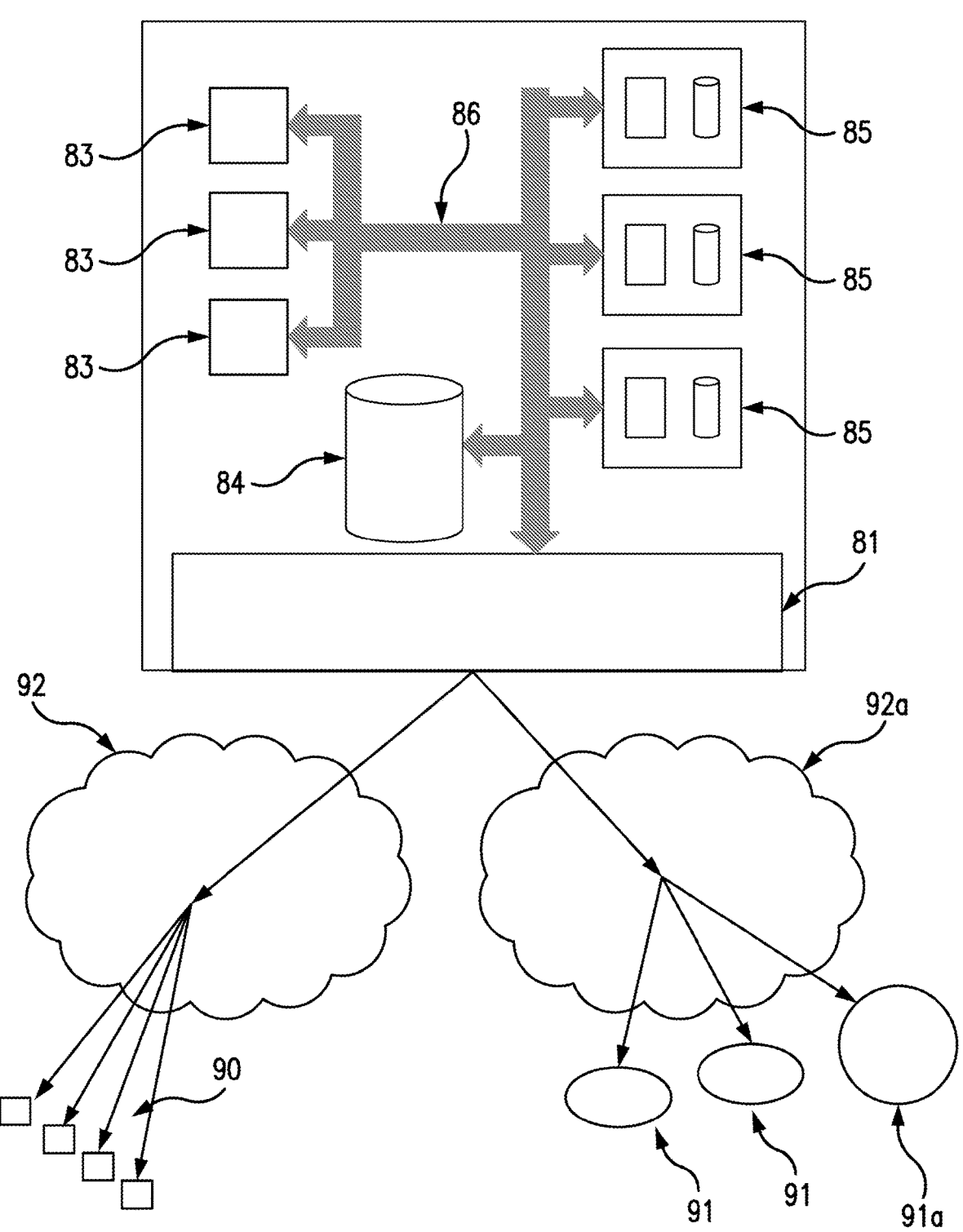
FIG. 10 illustrates elements within the computing node of FIG. 9.
Figure 11:
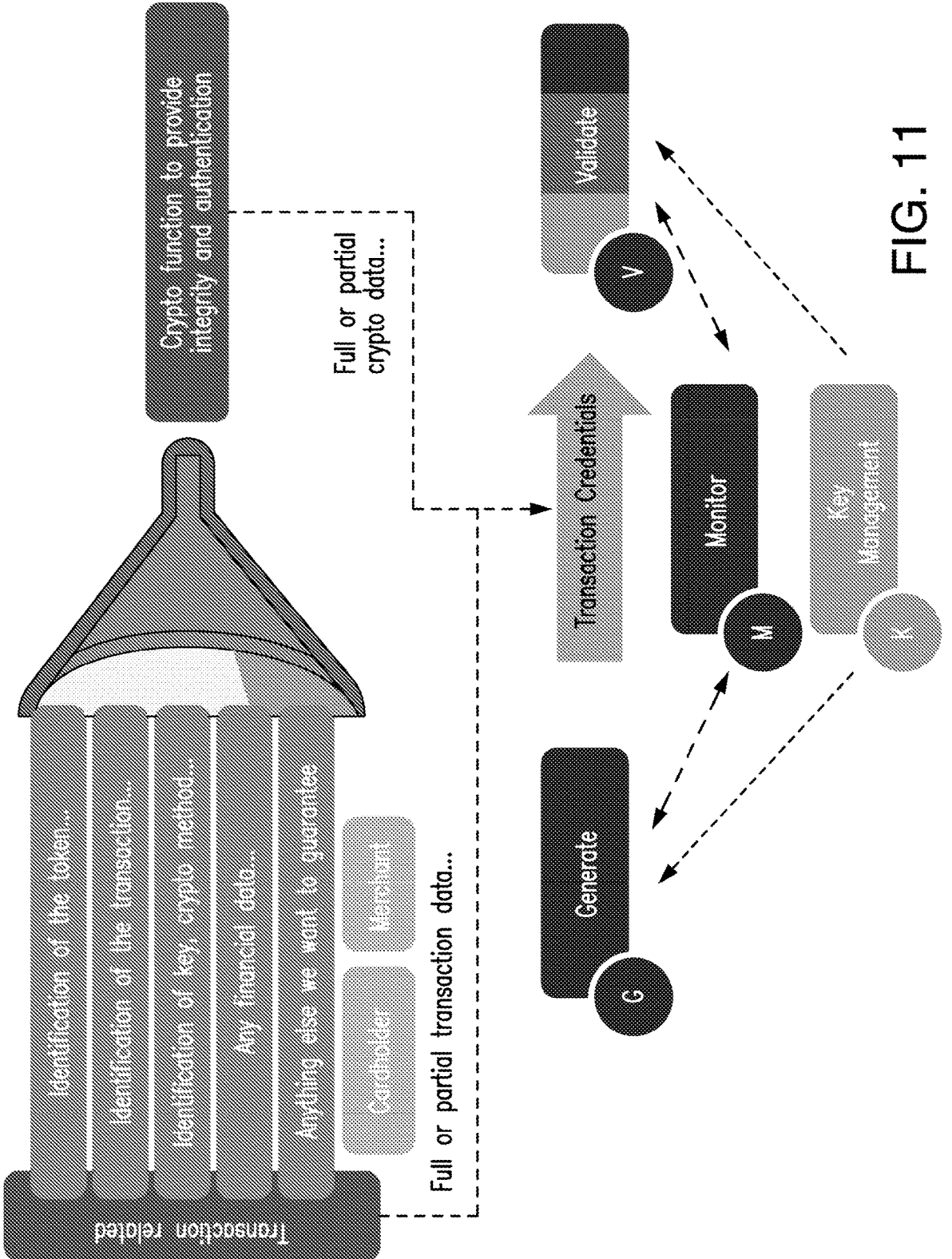
Figure 12:
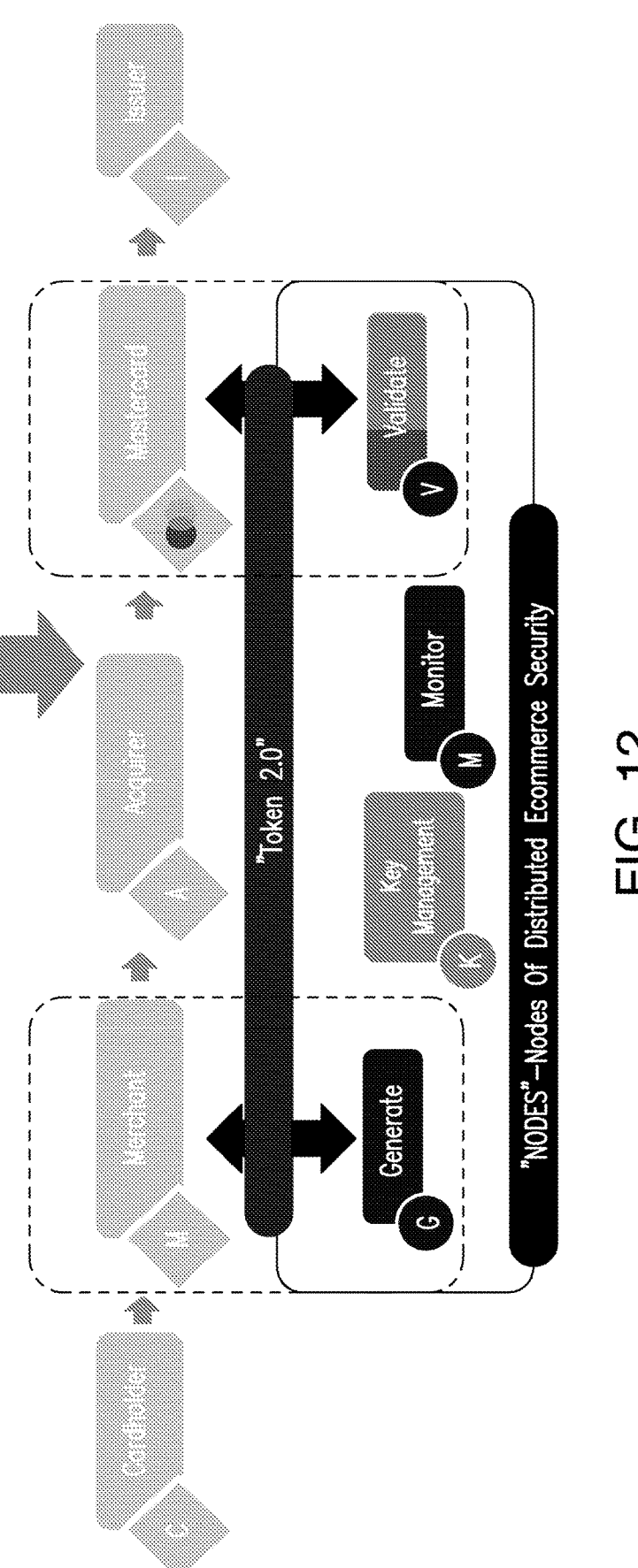
Figure 14:
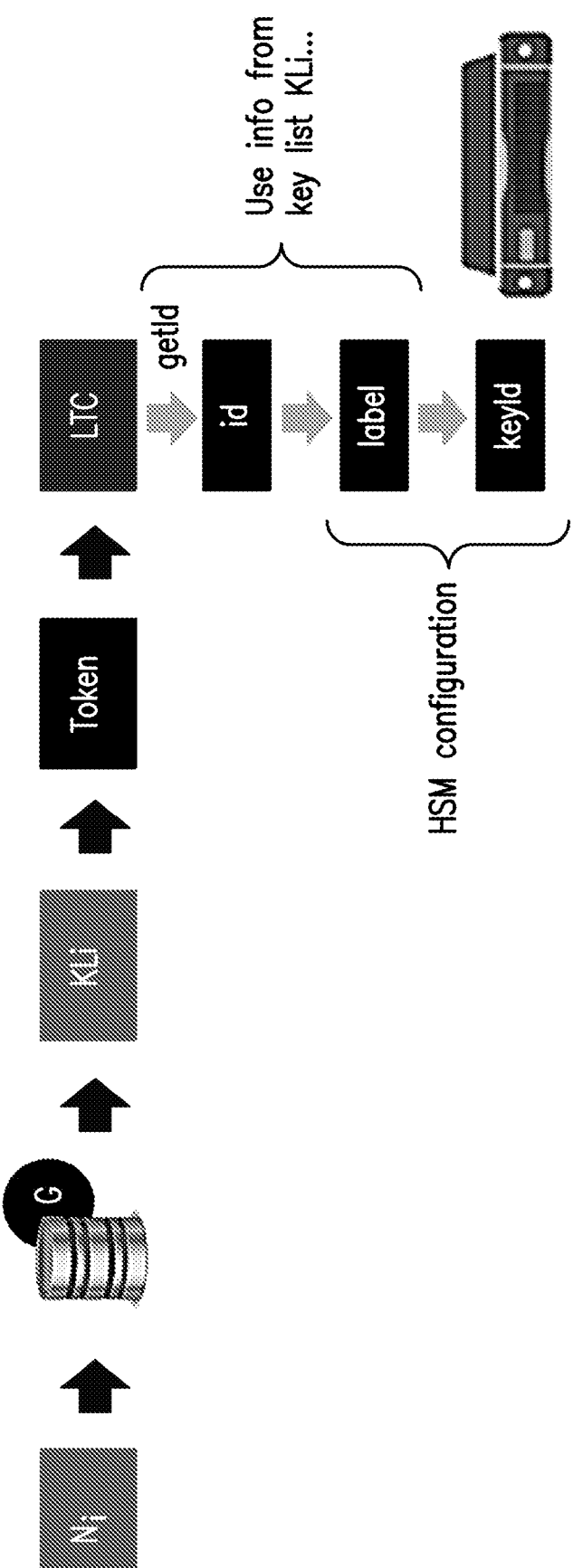
Figure 15:
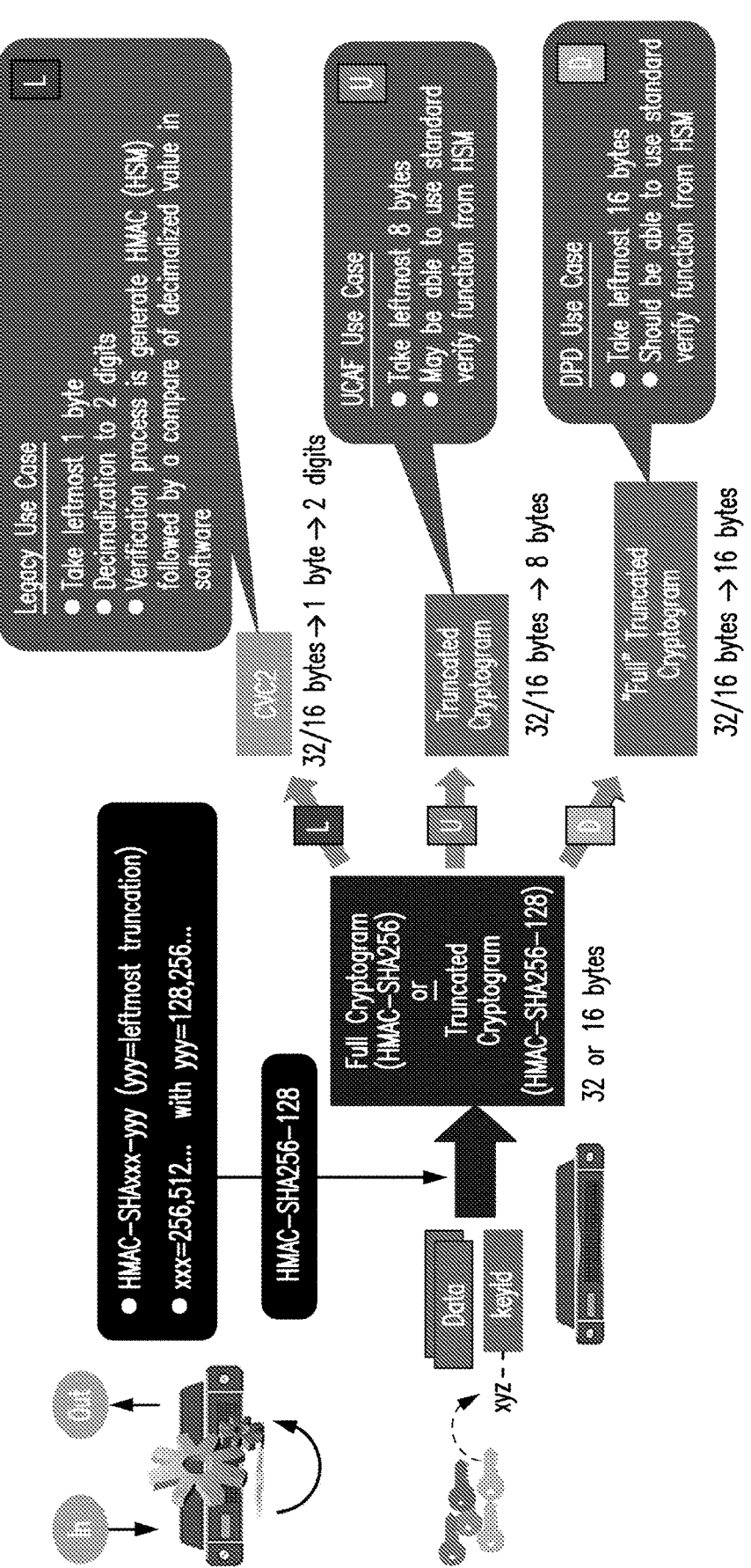
Figure 17:
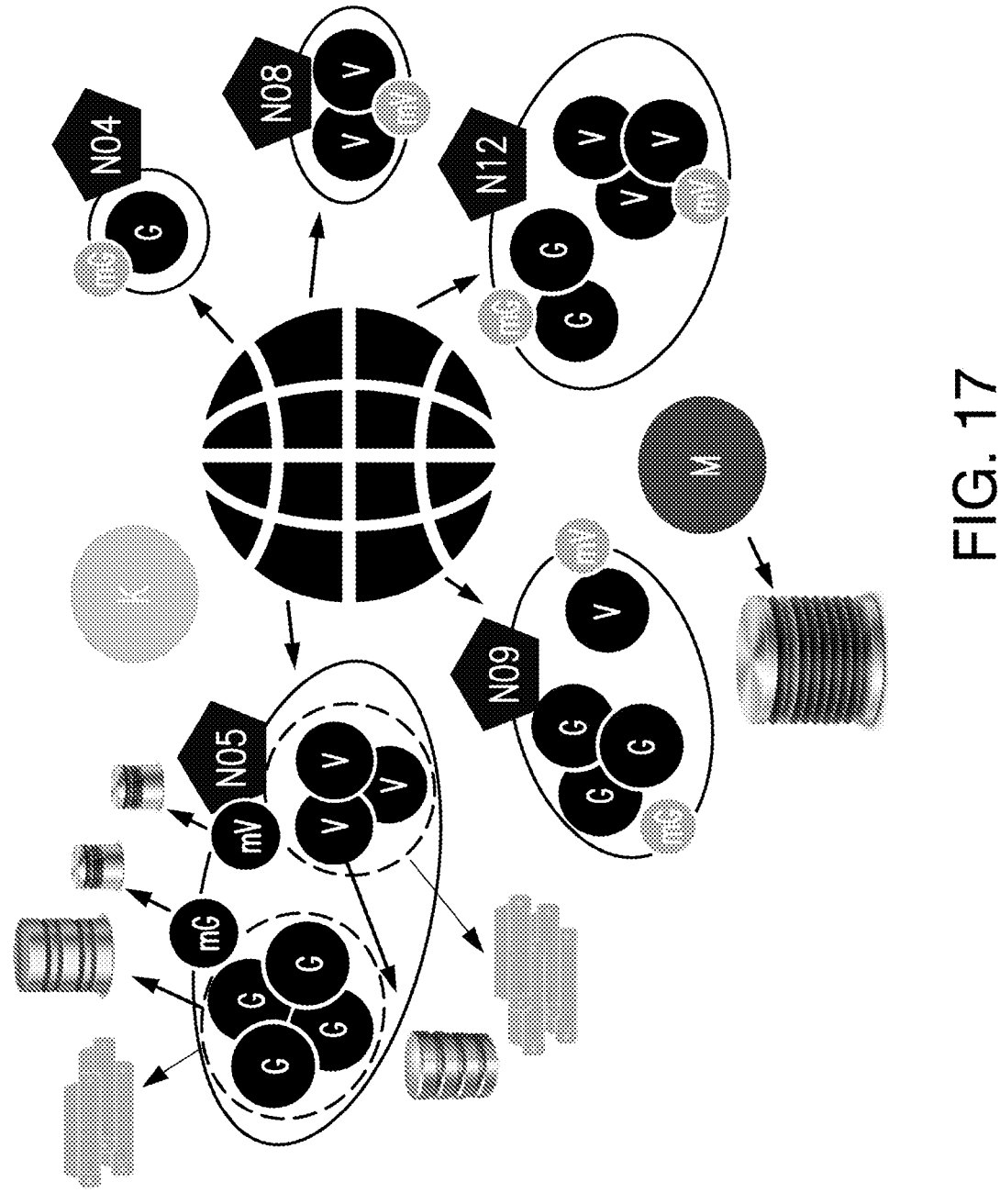
Figure 18:
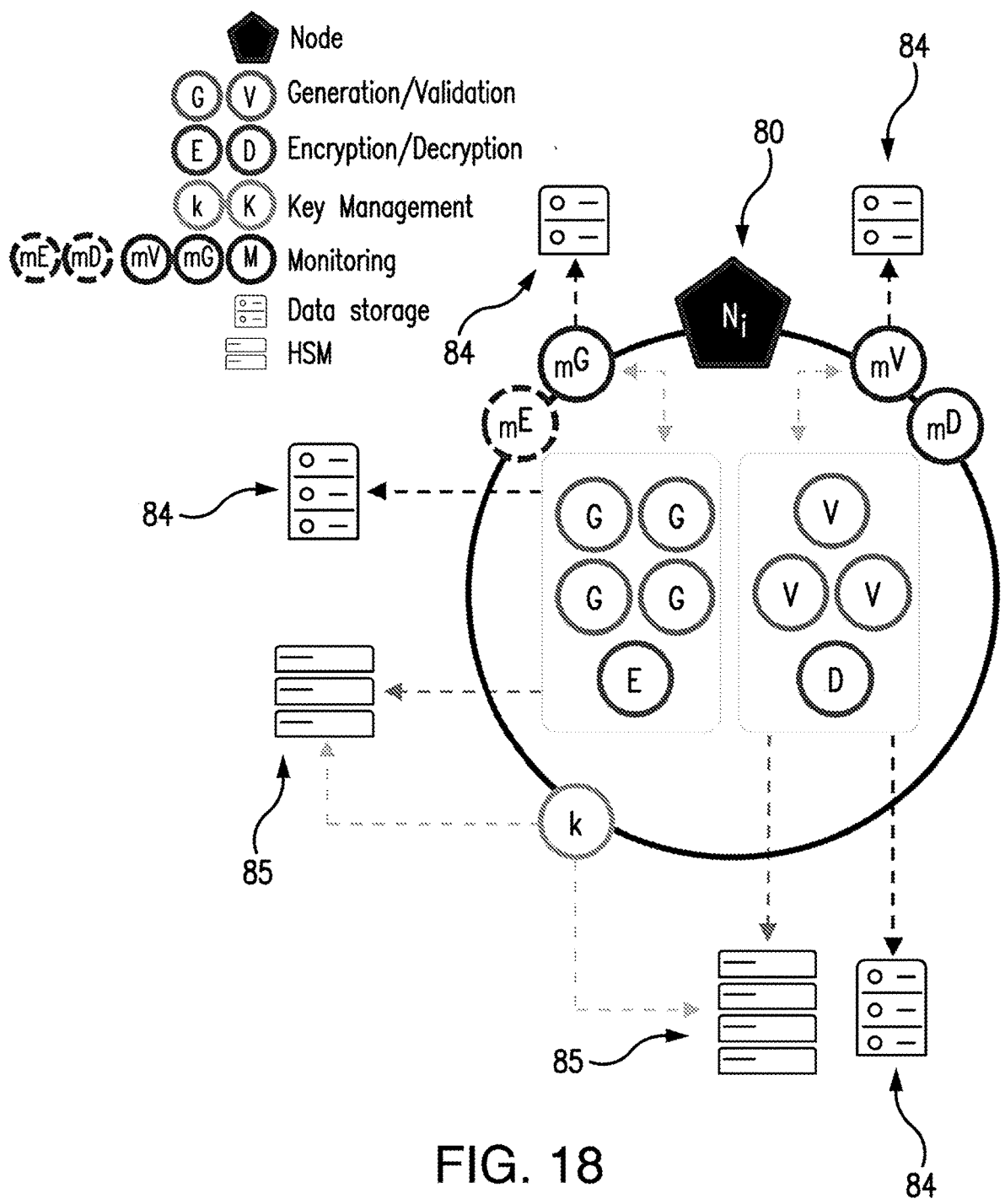
Figure 19:
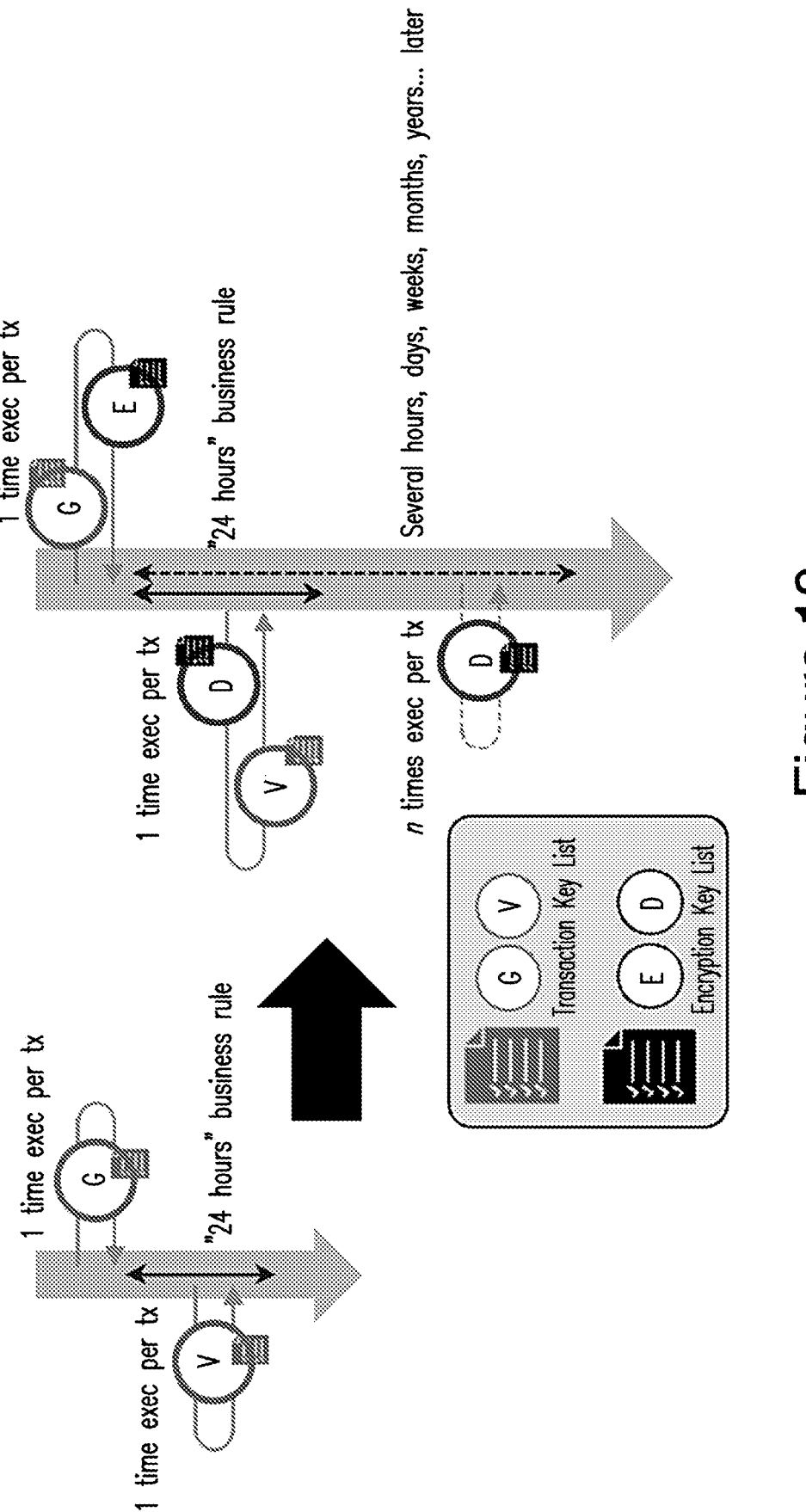
Figure 20:
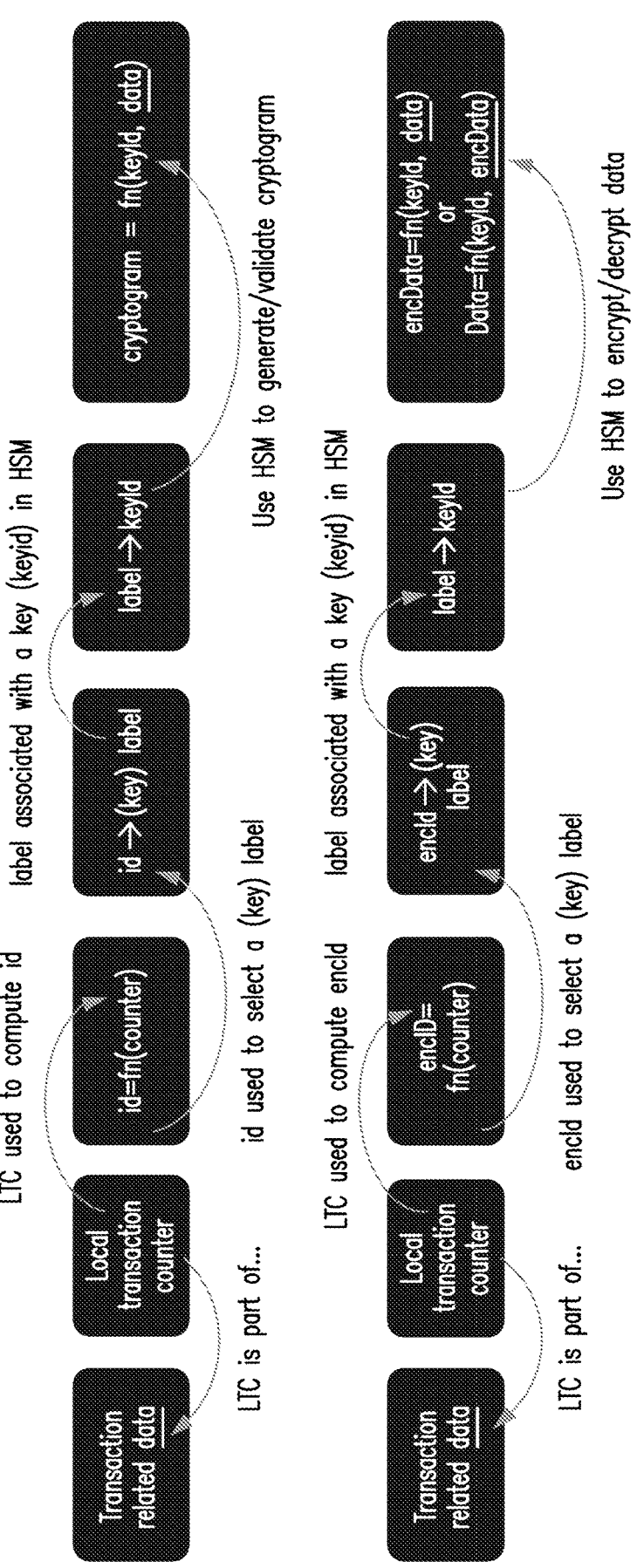
Figure 21:
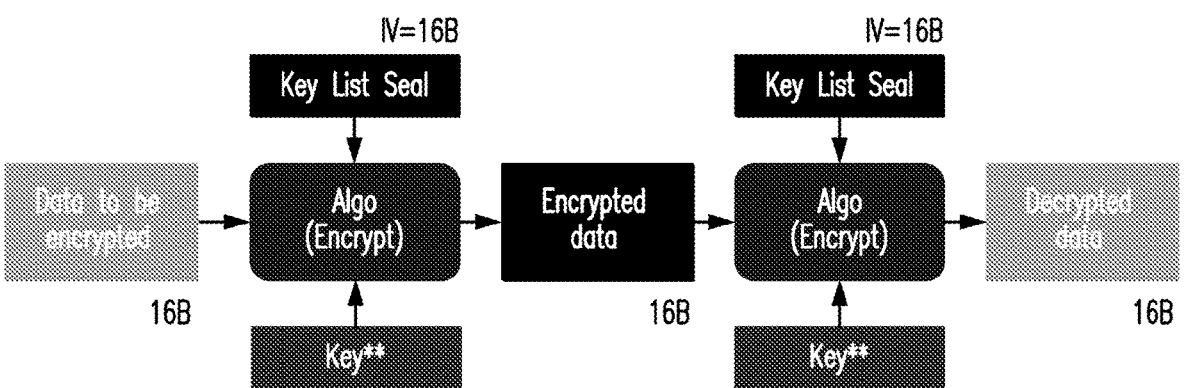
Figure 22:
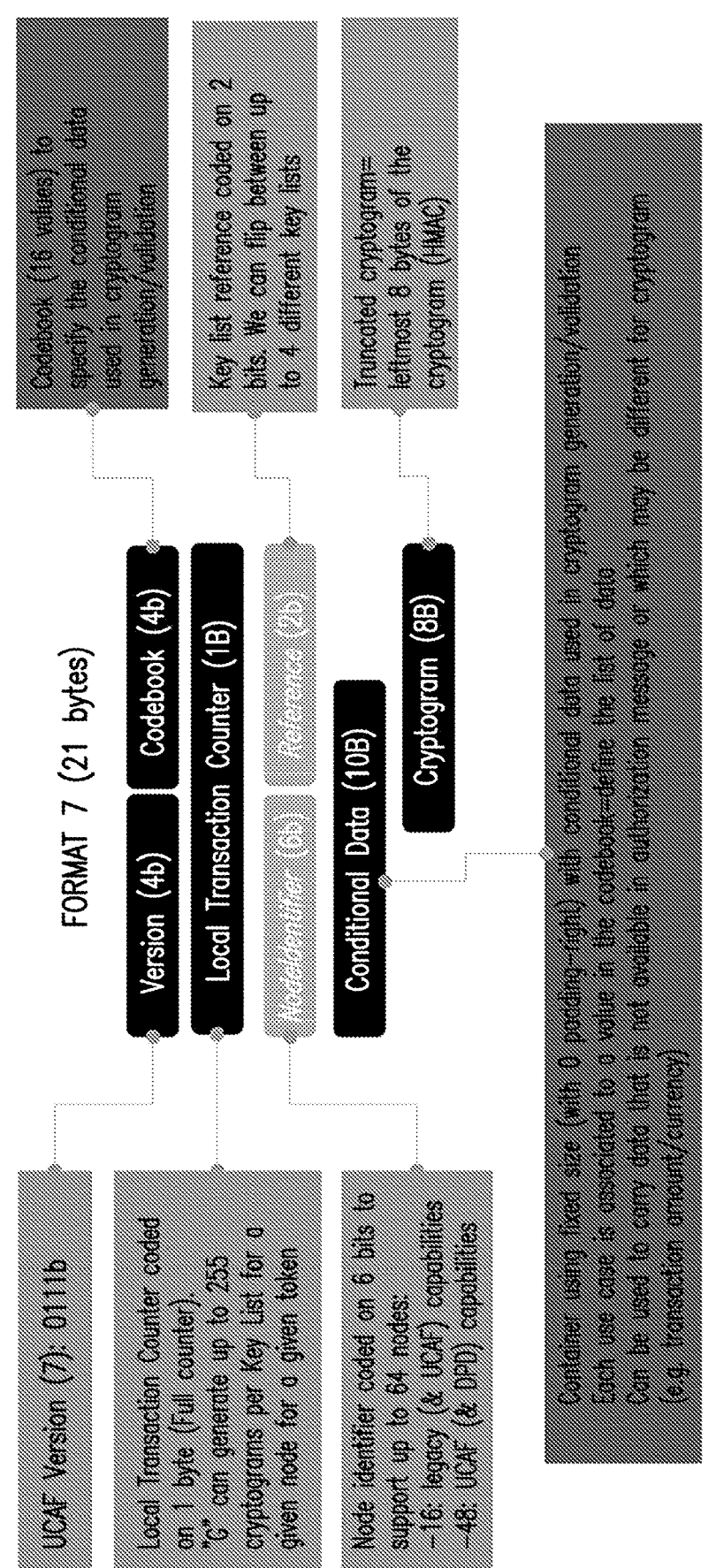
Figure 23:
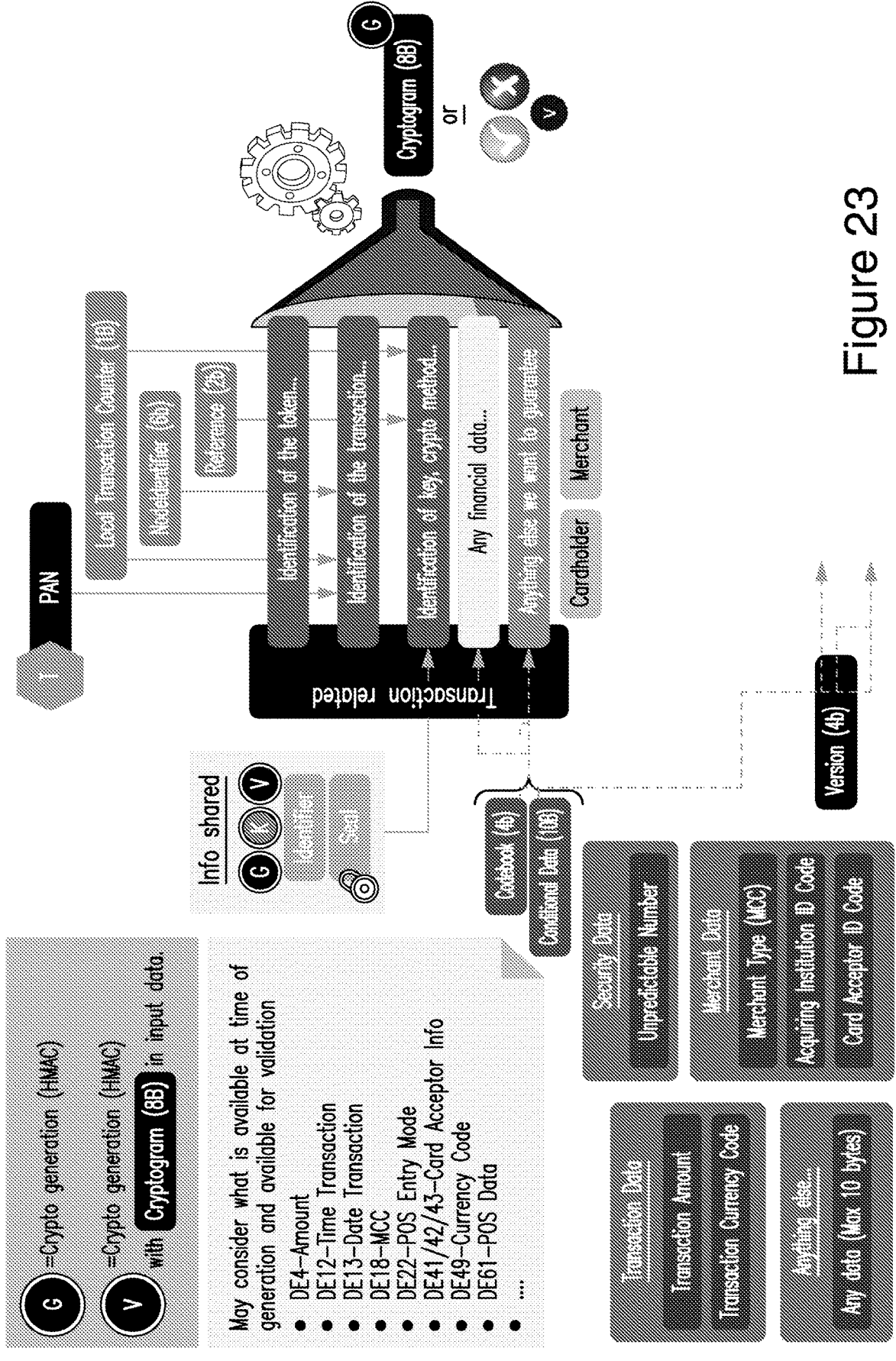
Figure 25:
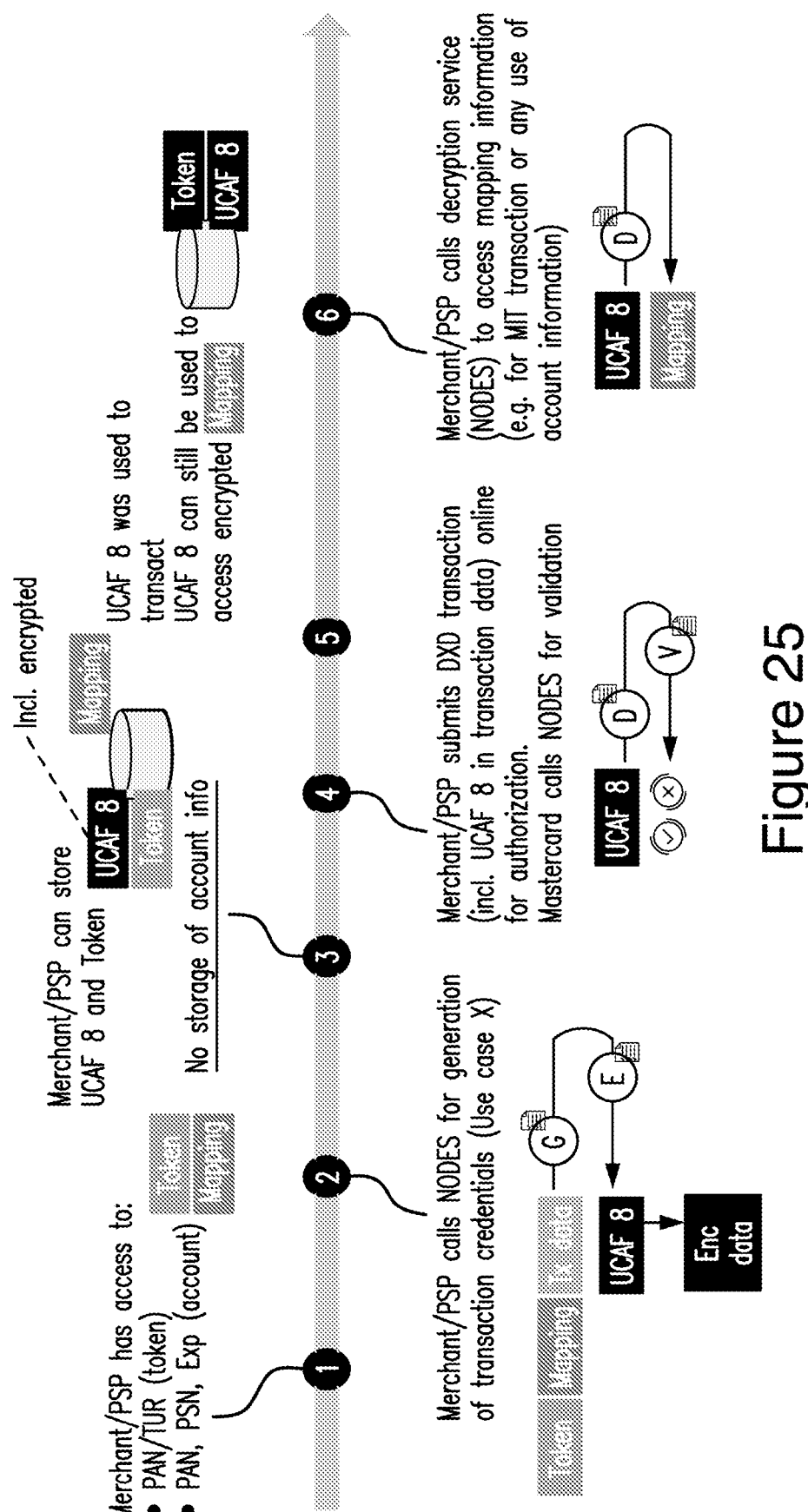
Figure 26:
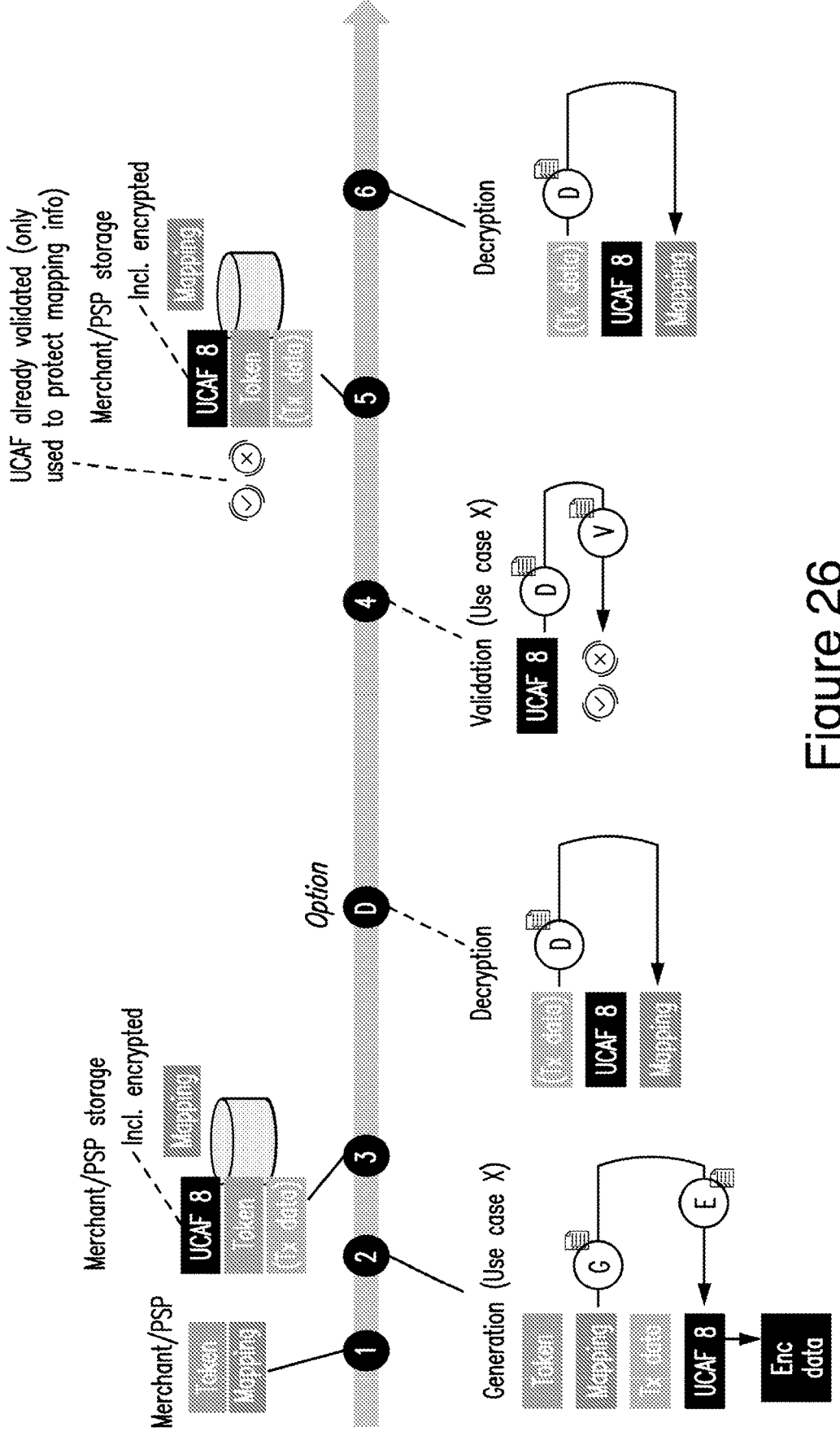
Figure 27:
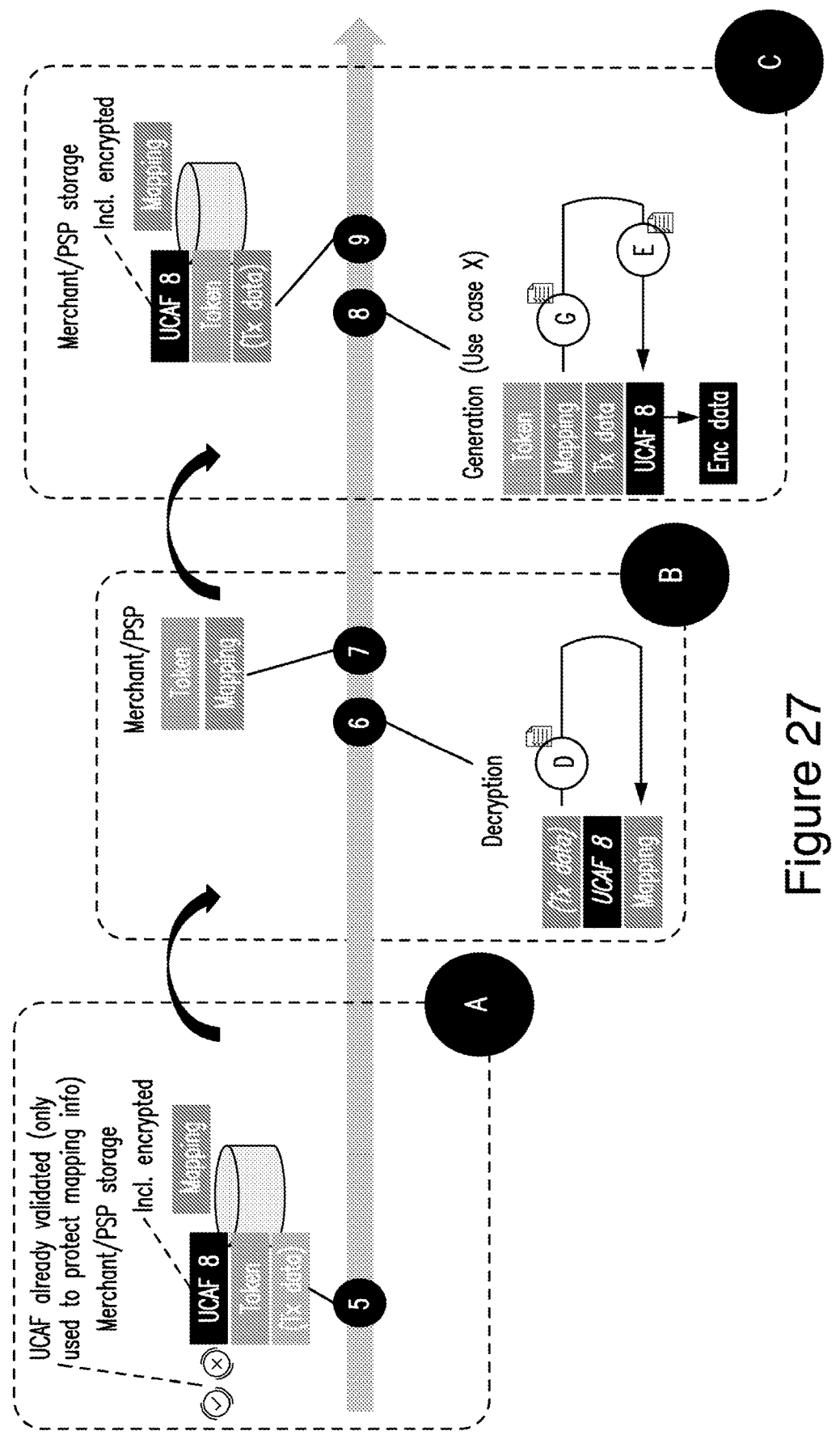

FIG. 11 indicates transaction flow in relation to operations performed by the node of FIG. 9;

FIG. 12 indicates use of tokenisation in an embodiment of the arrangement of FIGS. 9 to 11;

FIG. 13 indicates an approach to key management used in the arrangement of FIGS. 8 to 12;

FIG. 14 illustrates an exemplary approach to transaction identification;

FIG. 15 illustrates an exemplary set of cryptographic mechanisms for use for digitised transactions in the arrangement of FIGS. 8 to 14;

FIG. 16 illustrates a global model of key management with individual modes managed as shown in FIG. 13;

FIG. 17 illustrates a global model of monitoring associated with the key management model of FIGS. 13 and 16;

FIG. 18 shows management of a second layer of encryption in a node as shown in FIG. 9 according to an embodiment of the disclosure;

FIG. 19 shows how the use of encryption and decryption varies between the node of FIG. 9 and the node of FIG. 18;

FIG. 20 shows the relationships between transaction data and encrypted material in embodiments of the disclosure;

FIG. 21 shows an encryption and decryption process used in embodiments of the disclosure;

FIG. 22 illustrates an approach to carrying transaction credentials information as part of a transaction using a UCAF (Universal Cardholder Authentication Field) format suitable for use with the node of FIG. 9;

FIG. 23 illustrates an exemplary set of cryptographic mechanisms for use for digitised transactions using a UCAF format as shown in FIG. 22;

FIG. 24 illustrates an approach to carrying transaction credentials information as part of a transaction using a UCAF format suitable for use with the node of FIG. 18;

FIG. 25 illustrates performance of an initial transaction using the modified process shown in FIG. 19;

FIG. 26 illustrates access to mapping information before validation using the modified process shown in FIG. 19; and FIG. 27 illustrates access to mapping information for a subsequent transaction using the modified process shown in FIG. 19.

Figures 1, 2:
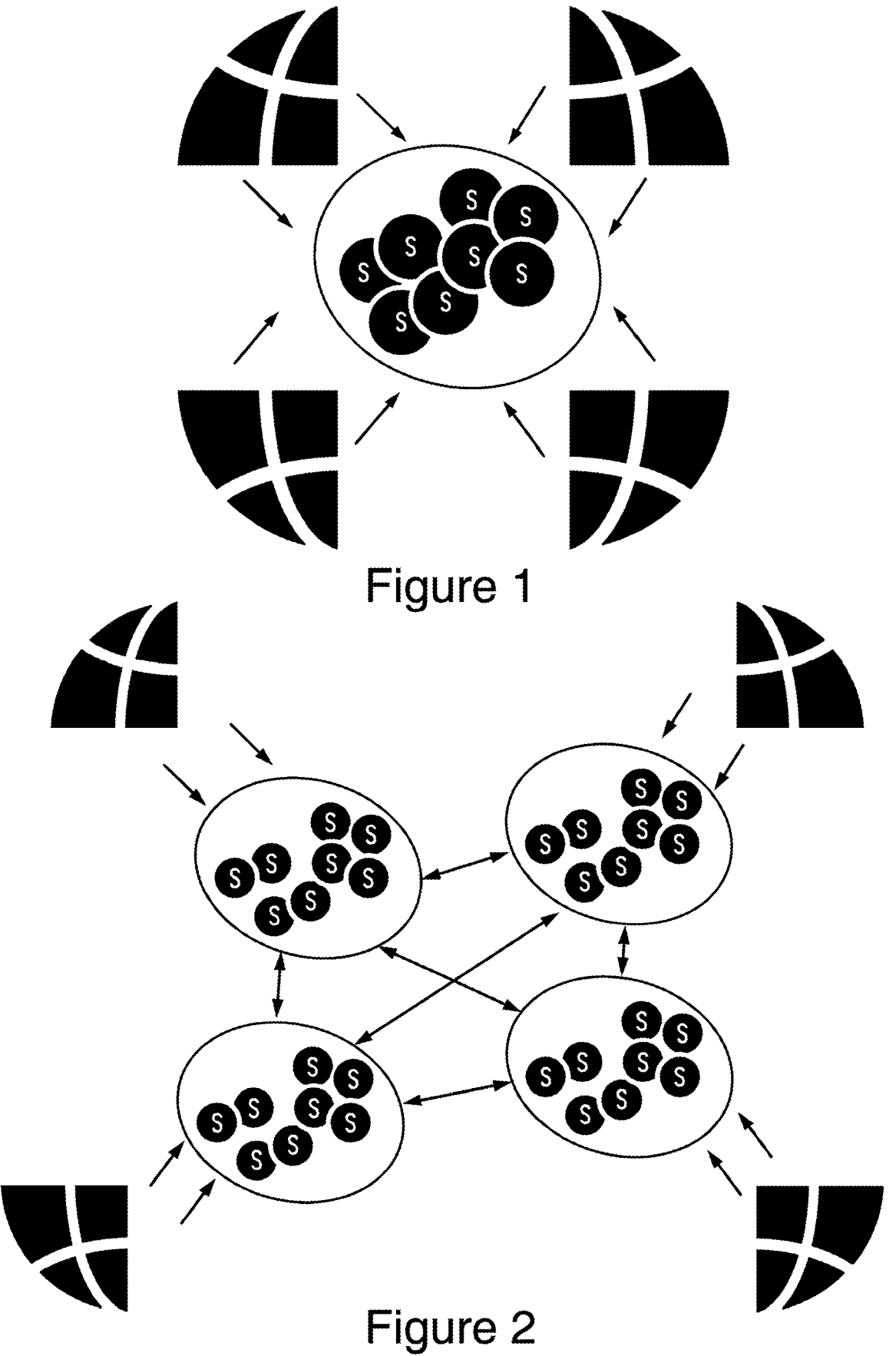
FIG. 1 shows multiple clients interacting with a central server.
FIG. 2 shows multiple clients interacting with a distributed computing architecture providing the same services as the central server of FIG. 1.
Figure 3:
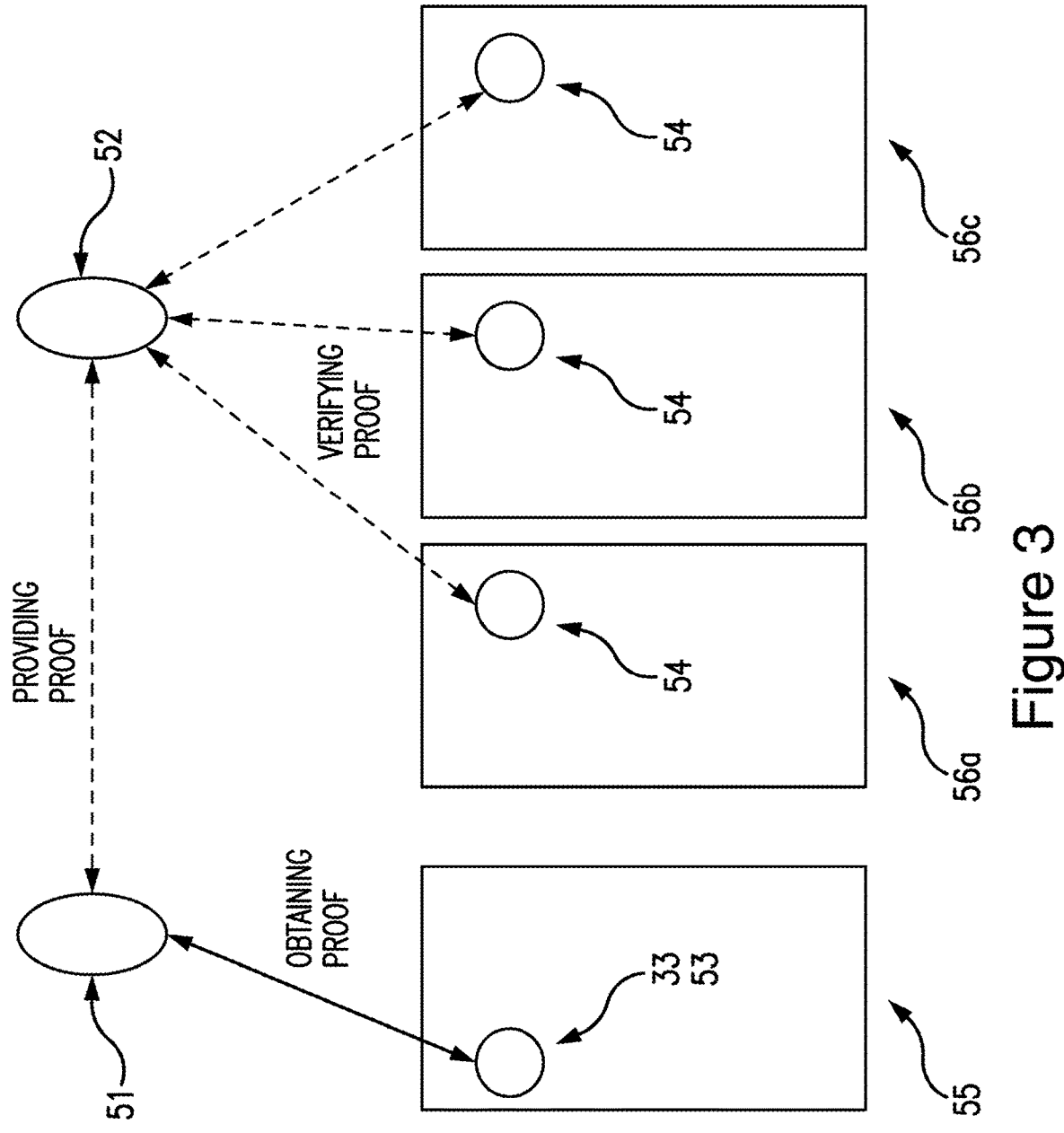
FIG. 3 shows operation of a distributed system such as that shown in FIG. 2 where distributed nodes create and validate proofs.

In general terms, the context of the disclosure is illustrated in FIGS. 1 to 3. FIG. 1 shows a central system performing functions in response to requests from a very large number of geographically distributed entities. This places intense demand on the central system in relation to processing capability, storage and messaging, and will typically lead to significant load on the system overall because of bottlenecks and messaging requirements. This is in addition to the problem of network latency resulting from travel time when a request is coming from a geographically distant requester communicating with a centralized system.

FIG. 2 shows an alternative arrangement in which the role of the central system is replicated so that the same functions are performed by a distributed set of nodes, each with the capability to perform some or all of the functions provided by the central system. Individual nodes should see a significantly lower demand than the central system, and as entities should be able to interact with a more local node than the central system, there is potential to reduce network latency. However, as discussed above in general terms, and below with specific relevance to a transaction processing system, there are significant technical challenges in achieving this benefit—in particular, there would for straightforward replication be a need to distribute all the same information to all the nodes replicating the centralized system, generally making the overall position worse rather than better.

There are particular difficulties where it is necessary for a second user of the system to be satisfied that an action taken by a first user of the system was legitimate. In the FIG. 1 case, this is relatively straightforward—as the service is performed centrally and the central system has all information, then if users trust the central system this is typically not problematic. In the FIG. 2 case, the first user may have been interacting with one node and the second user may be interacting with another node, in which case the same level of confidence cannot be achieved unless all necessary information is held in common between all the nodes, suitably synchronized, which would defeat the point of disaggregation when replicating a centralized system. If the product of the first service performed by the first user is valuable information—such as the proof of a payment made by the first user to be used by a second user in completing a transaction—then risks of system failure or compromise by, for example, use of a proof at multiple nodes by multiple second users to complete a relevant transaction, need to be addressed.

Generally, this situation is shown in FIG. 3. A first user 51 requests execution of a first service 53—in this case, the creation of a proof of an event such as a payment from a particular account—and a second user 52 requests validation of the proof of this event, for example to determine that a payment is validly made, from a second service 54. The first user 51 has invoked the first service 53 at a first node 55. The second user will typically not have a choice of where to invoke the second service 54—this may be a matter of geography or other administrative factors—and in particular may not be able to invoke the second service 54 at the first node 55 (though this may be a possibility). In practice, the second service 54 will then be invoked at a further node 56a, 56b, 56c that has sufficient information to achieve the validation process. Typically, this will involve access to a common set of cryptographic keys together with the minimal set of information required to regenerate the proof or otherwise determine that the proof is correct—as discussed below, in embodiments a limited set of keys may be used. Situations in which such a proof, or an object claiming to be such a proof, is presented to one or more second services at one or more nodes need to be addressed for such a system to function reliably and securely.

Figure 4:
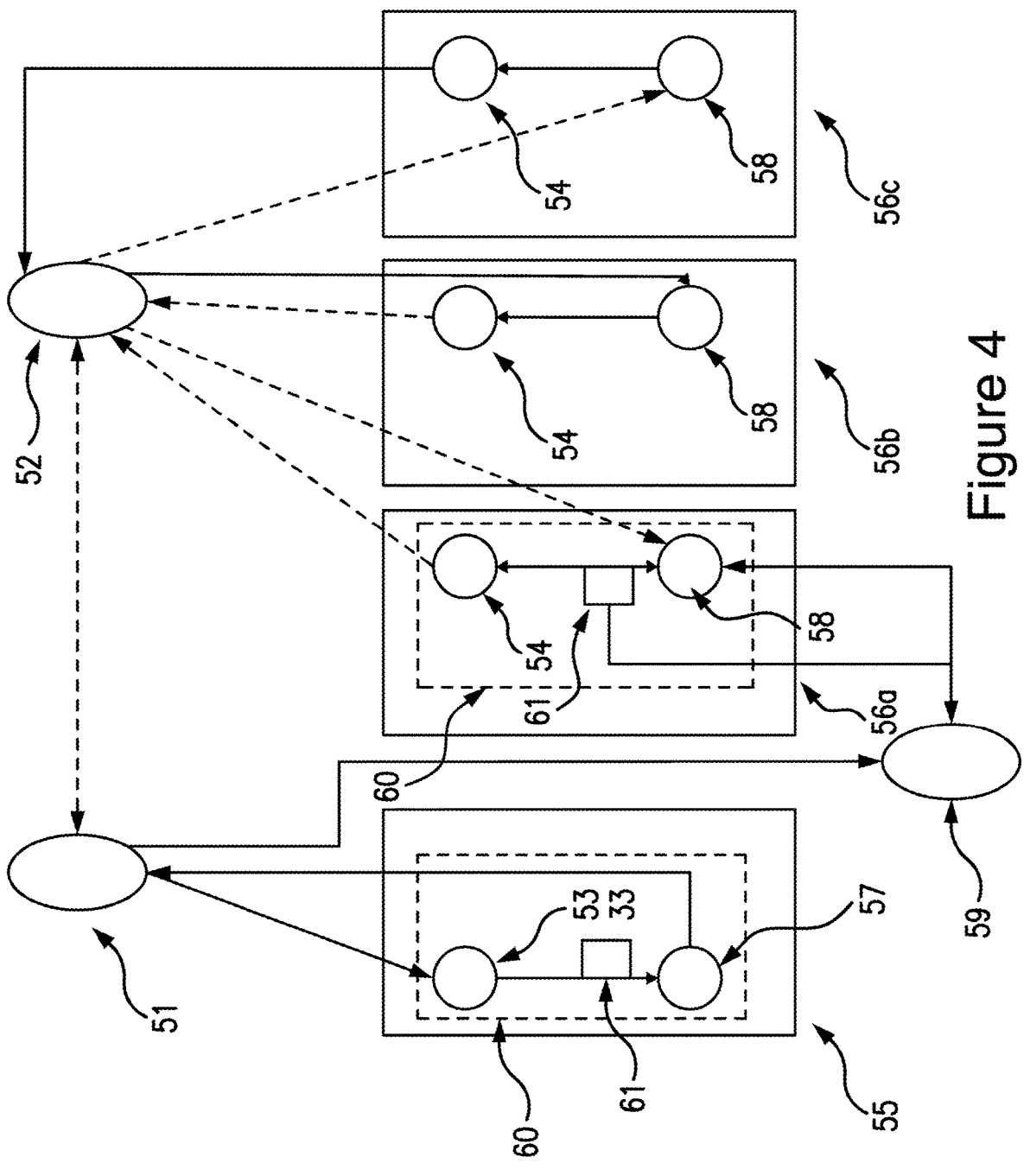
FIG. 4 shows an approach to providing an additional encryption layer in the arrangement of FIG. 3 according to embodiments of the disclosure

The present disclosure teaches a development upon this approach, shown in FIG. 4. The first user 51 requests execution of a first service 53 as before, but the output of the first service 53 is now provided to a third service 57 for further processing—in this case, encryption of the event proof provided by the first service 53. In the case shown, both the first service 53 and the third service 57 are shown as part of a larger node process 60. This node process 60 also here provides additional information 61 along with the event proof from the first service 53, with the two being encrypted in a common envelope by the third service 53. The encrypted output of the third service 57 is again provided to the first user 51—as is discussed further below, this may be as part of a message which contains this encrypted output as an encrypted part along with an unencrypted part also provided by node process 60. The unencrypted part may be used to identify a service instance, with the event proof and other sensitive data held in the encrypted part. This may again be shared with the second user 52.

The second user 52 obtains validation of the proof as before, with the variation that before invoking the second service 54 at a further node 56a, 56b, 56c a fourth service 58 must be invoked to recover the proof for validation by the second service 54.

In embodiments, there may only be a short window for the validation—for example, 24 hours. The timeframe for encryption and decryption may be much longer, as information about the service event may be needed long after it has been validated, or validation is even still possible. In this period, it may no longer be necessary to validate the transaction, but it may be strongly desirable to recover the additional information 61. This can be done by identification of a relevant transaction—for example, by using the unencrypted part of the message described earlier—and using this information to obtain decryption. Here, a third user 59 needs to establish this additional information—this can be achieved here from the fourth service 58 alone, without any need to invoke the second service 54, with the relevant node process 60 returning the additional information. The fourth service 58 may even be used to establish this additional information before validation has taken place (or if validation never takes place).

The same processes for key identification may be used by all the processes, though as indicated encryption and decryption may operate over a much longer timescale, and so different key rotation strategies may be employed. Different algorithms may be required for generation/validation (which may involve using a hash with an input of a large or variable amount of data) and for encryption/decryption (which may involve a block cipher).

This issue is particularly relevant to transaction processing systems, and in particular to systems for handling digital transactions. The number of digital transactions is increasing extremely rapidly, and it is necessary for them to execute reliably and rapidly. Support of these transactions can use transaction processing systems developed for device-based payments using payment cards and use the protocols of such payment systems, but in practice such transactions have a different character from device-based transactions. This is discussed below, first by reference to the general elements of a transaction processing system, and then by a more detailed discussion of the infrastructure used to support digital transactions.

Figure 5:
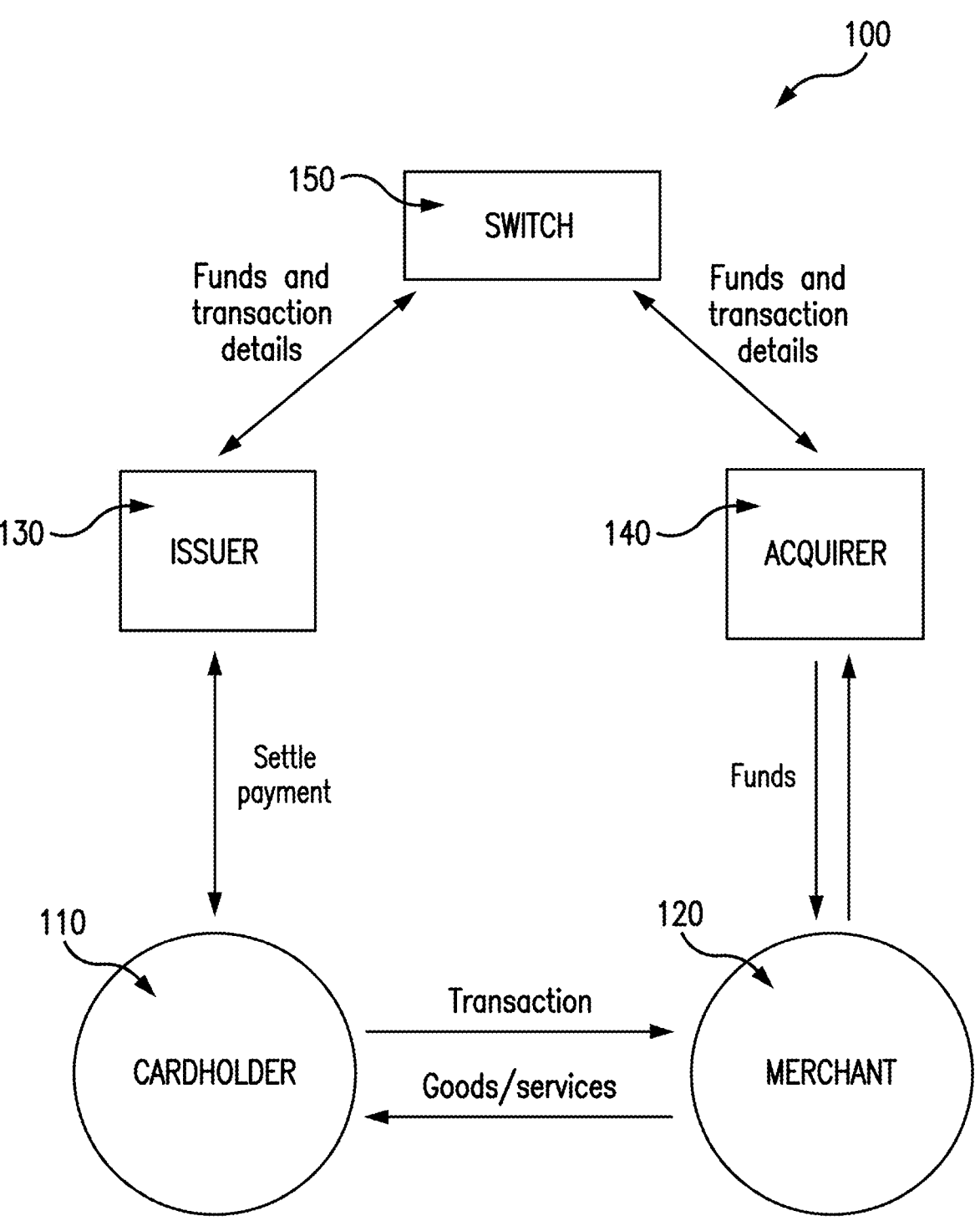
FIG. 5 shows schematically a distributed transaction architecture using a four-party model.

FIG. 5 is a block diagram of a typical four-party model or four-party payment transaction scheme. The diagram illustrates the entities present in the model and the interactions occurring between entities operating in a card scheme.

Normally, card schemes—payment networks linked to payment cards—are based on one of two models: a three-party model or a four-party model (adopted by the present applicant). For the purposes of this document, the four-party model is described in further detail below.

The four-party model may be used as a basis for the transaction network. For each transaction, the model comprises four entity types: cardholder 110, merchant 120, issuer 130 and acquirer 140. In this model, the cardholder 110 purchases goods or services from the merchant 120. The issuer 130 is the bank or any other financial institution that issued the card to the cardholder 110. The acquirer 140 provides services for card processing to the merchant 120.

The model also comprises a central switch 150—interactions between the issuer 130 and the acquirer 140 are routed via the switch 150. The switch 150 enables a merchant 120 associated with one particular bank acquirer 140 to accept payment transactions from a cardholder 110 associated with a different bank issuer 130.

A typical transaction between the entities in the four-party model can be divided into two main stages: authorisation and settlement. The cardholder 110 initiates a purchase of a good or service from the merchant 120 using their card. Details of the card and the transaction are sent to the issuer 130 via the acquirer 140 and the switch 150 to authorise the transaction. The cardholder 110 may have provided verification information in the transaction, and in some circumstances may be required to undergo an additional verification process to verify their identity (such as 3-D Secure in the case of an online transaction). Once the additional verification process is complete the transaction is authorised.

On completion of the transaction between the cardholder 110 and the merchant 120, the transaction details are submitted by the merchant 120 to the acquirer 140 for settlement.

The transaction details are then routed to the relevant issuer 130 by the acquirer 140 via the switch 150. Upon receipt of these transaction details, the issuer 130 provides the settlement funds to the switch 150, which in turn forwards these funds to the merchant 120 via the acquirer 140.

Separately, the issuer 130 and the cardholder 110 settle the payment amount between them. In return, a service fee is paid to the acquirer 140 by the merchant 120 for each transaction, and an interchange fee is paid to the issuer 130 by the acquirer 140 in return for the settlement of funds.

In practical implementations of a four-party system model, the roles of a specific party may involve multiple elements acting together. This is typically the case in implementations that have developed beyond a contact-based interaction between a customer card and a merchant terminal to digital implementations using proxy or virtual cards on user computing devices such as a smart phone.

Figure 6:
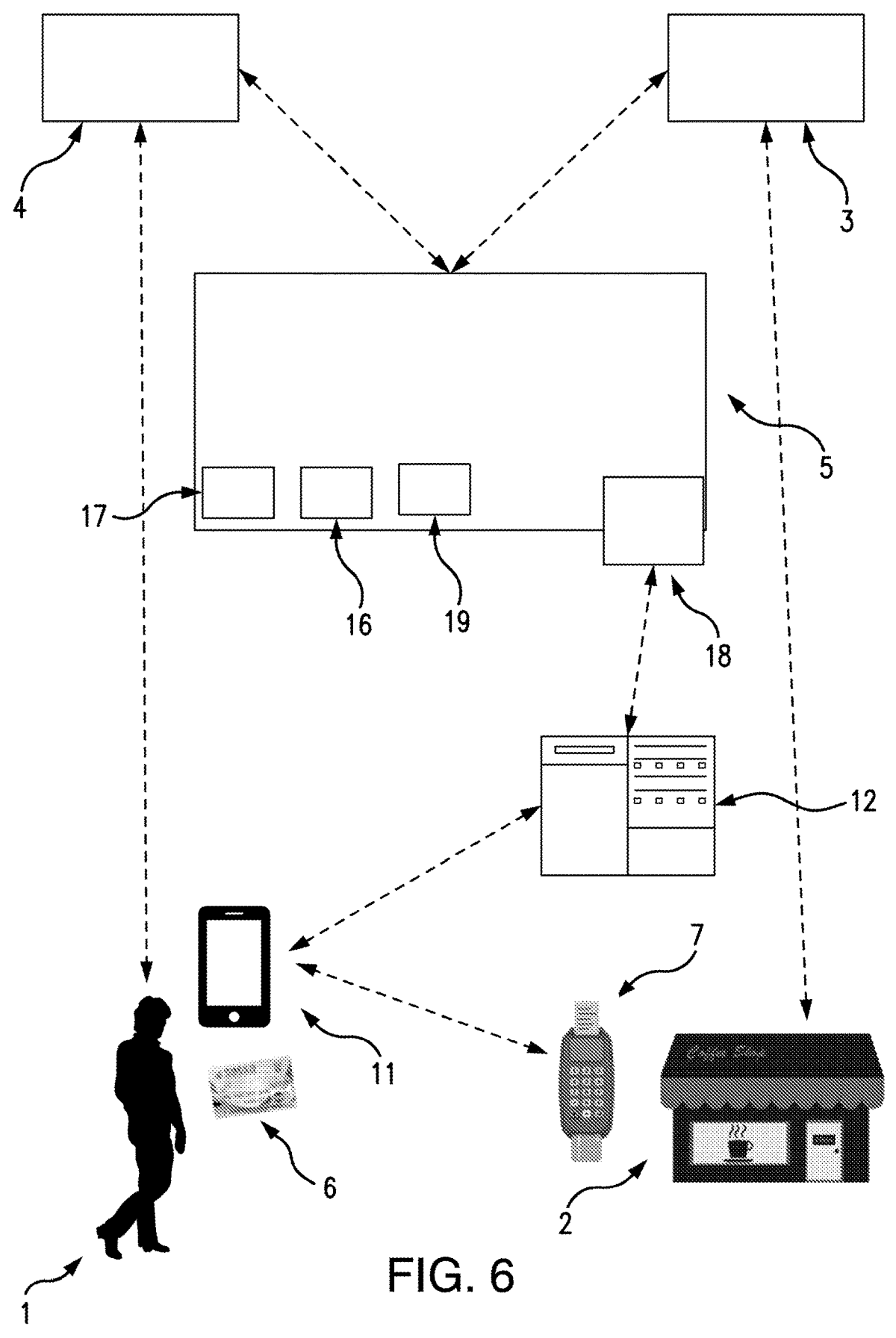

FIG. 6 shows an architecture according to an embodiment of the disclosure appropriate for interaction between a cardholder and a merchant. This Figure shows a general-purpose architecture for reference but shows in particular elements of an architecture used when a cardholder carries out an online transaction with a merchant server.

For a conventional transaction, a cardholder will use their payment card 6—or a mobile computing device such as smartphone 11 adapted for use as a contactless payment device—to transact with a POS terminal 7 of a merchant 2. However, in embodiments relevant to the present invention, the cardholder will use his or her computing device—which may be any or all of a cellular telephone handset, a tablet, a laptop, a static personal computer or any other suitable computing device (here cellular telephone handset or smartphone 11 is shown)—and other computing devices such as a smart watch or other wearable device may also be used)—to act either as a proxy for a physical payment card 6 or as a virtual payment card operating only in a digital domain. The smartphone 11 may achieve this with a mobile payment application and a digital wallet, as described below. The smart phone 11 can use this to transact with a merchant POS terminal 7 using NFC or another contactless technology, or to make a payment in association with its wallet service as discussed below. However, online transactions with a merchant are of particular interest in connection with embodiments of the disclosure, rather than contact or contactless transactions with a merchant POS terminal 7. To make an online transaction, the smartphone 11 may also be able to interact with a merchant server 12 representing the merchant 2 over any appropriate network connection, such as the public internet—the connection to the merchant may be provided by an app or application on the computing device.

The transaction scheme infrastructure (transaction infrastructure) 5 here provides not only the computing infrastructure necessary to operate the card scheme and provide routing of transactions and other messaging to parties such as the acquirer 3 and the issuer 4, but also a wallet service 17 to support a digital wallet on the cardholder computing device, and an internet gateway 18 to accept internet based transactions for processing by the transaction infrastructure. In other embodiments, the wallet service 17 may be provided similarly by a third party with an appropriate trust relationship with the transaction scheme provider. To support tokenisation, a token service provider 19 is present (again, this is shown as part of transaction infrastructure 5 but may be provided by a third party with appropriate trust relationships), and the transaction scheme infrastructure provides a digital enablement service 16 to support the performance of tokenised digital transactions, and to interact with other elements of the system to allow transactions to be performed correctly—this digital enablement service may include other elements, such as token service provision.

For a tokenised transaction, the transaction is validated in the transaction scheme by mapping the cardholder token to their card PAN, checking the status of the token (to ensure that it is in date and otherwise valid) and any customer verification approach used. This allows the issuer to authorise the transaction in the normal manner.

Figure 7:
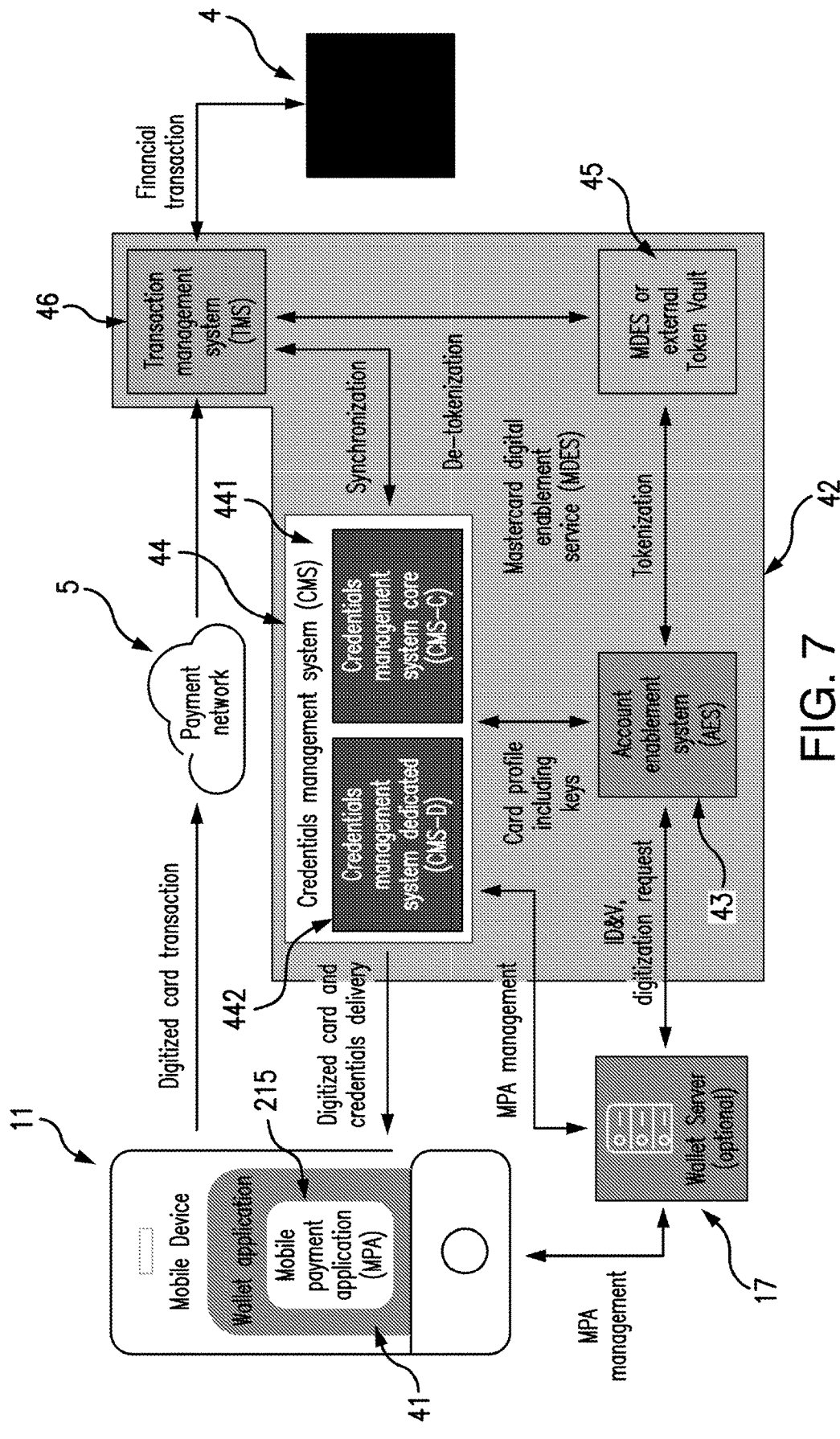
FIG. 7 shows schematically an exemplary system for enabling digital transactions in the transaction architecture of FIGS. 5 and 6.

FIG. 7 shows elements of a transaction infrastructure to support digitised payments from a mobile device in more detail. This Figure shows as a specific example the applicant's Mastercard Cloud-Based Payment (MCBP) architecture—this is exemplary rather than specific to the invention, and illustrates how the architecture is used to support a mobile payment application 215 on a mobile device (such as smartphone 11)—here the mobile payment application 215 is shown as contained within a wallet application or digital wallet 41. Such a digital wallet 41 may communicate with a wallet server 17 to allow management of the mobile payment application, and it also can be used to request digitization of a payment card 6 to be used by the mobile device 11.

The Mastercard Digital Enablement Service (MDES) 42 performs a variety of functions to support mobile payments and digitized transactions. As indicated above, the MDES 42 is exemplary only—other embodiments may use digitisation, tokenisation and provisioning services associated with other transaction processing infrastructures, for example. The wallet server 17 is not a part of the MDES 42—and need not be present, for example if the mobile payment application 215 is not embedded within a digital wallet 41—but acts as an interface between the mobile device 11 and the MDES 42. The MDES 42 also mediates tokenised transactions so that they can be processed through the transaction scheme as for conventional card transactions. The following functional elements shown within the MDES 42: the Account Enablement System (AES) 43, the Credentials Management System (CMS) 44, the Token Vault 45, and the Transaction Management System (TMS) 46. These will be described briefly below.

The Account Enablement System (AES) 43 is used in card digitisation and user establishment. It will interact with the mobile payment application (here through the wallet server 17) for card digitisation requests, and it will populate the Token Vault 45 on tokenisation and will interact with the CMS 44 to establish a card profile with associated keys for digital use of the card.

The Credentials Management System (CMS) 44 supports management of cardholder credentials and is a key system within the MDES 42. The core system 441 manages synchronisation with the transaction system as a whole through interaction with the TMS 46 and manages the channel to the AES 43. The dedicated system 442 provides delivery of necessary elements to the mobile payment application such as the digitized card and credentials and keys in the form needed for use. This system may also interact with the wallet server 17 for management of the mobile payment application.

The Token Vault 45—which is shown here as within the MDES 42, but which may be a separate element under separate control—is the repository for token information including the correspondence between a token and the associated card. In processing tokenised transactions, the MDES 42 will reference the Token Vault 45, and tokenisation of a card will result in creation of a new entry in the Token Vault 45.

Transaction Management System (TMS) 46 is used when processing tokenised transactions. If a transaction is identified by the transaction scheme as being tokenised, it is routed to the TMS 46 which detokenises the transaction by using the Token Vault 45. The detokenised transaction is then routed to the issuer (here represented by Financial Authorisation System 47) for authorisation in the conventional manner. The TMS 46 also interacts with the CMS 44 to ensure synchronisation in relation to the cardholder account and credentials.

An approach to enabling aspects of a system for the performance of a digitized transaction as shown in FIG. 7—and in particular the management of credentials—to be decentralized is described in the applicant's earlier European Patent Application No. 19178579.9, the contents of which are incorporated by reference to the extent permitted by applicable law. This is done by replacing a central node with a decentralized set of nodes each capable of credential management, as is shown in FIGS. 8 to 10.

Figure 8:
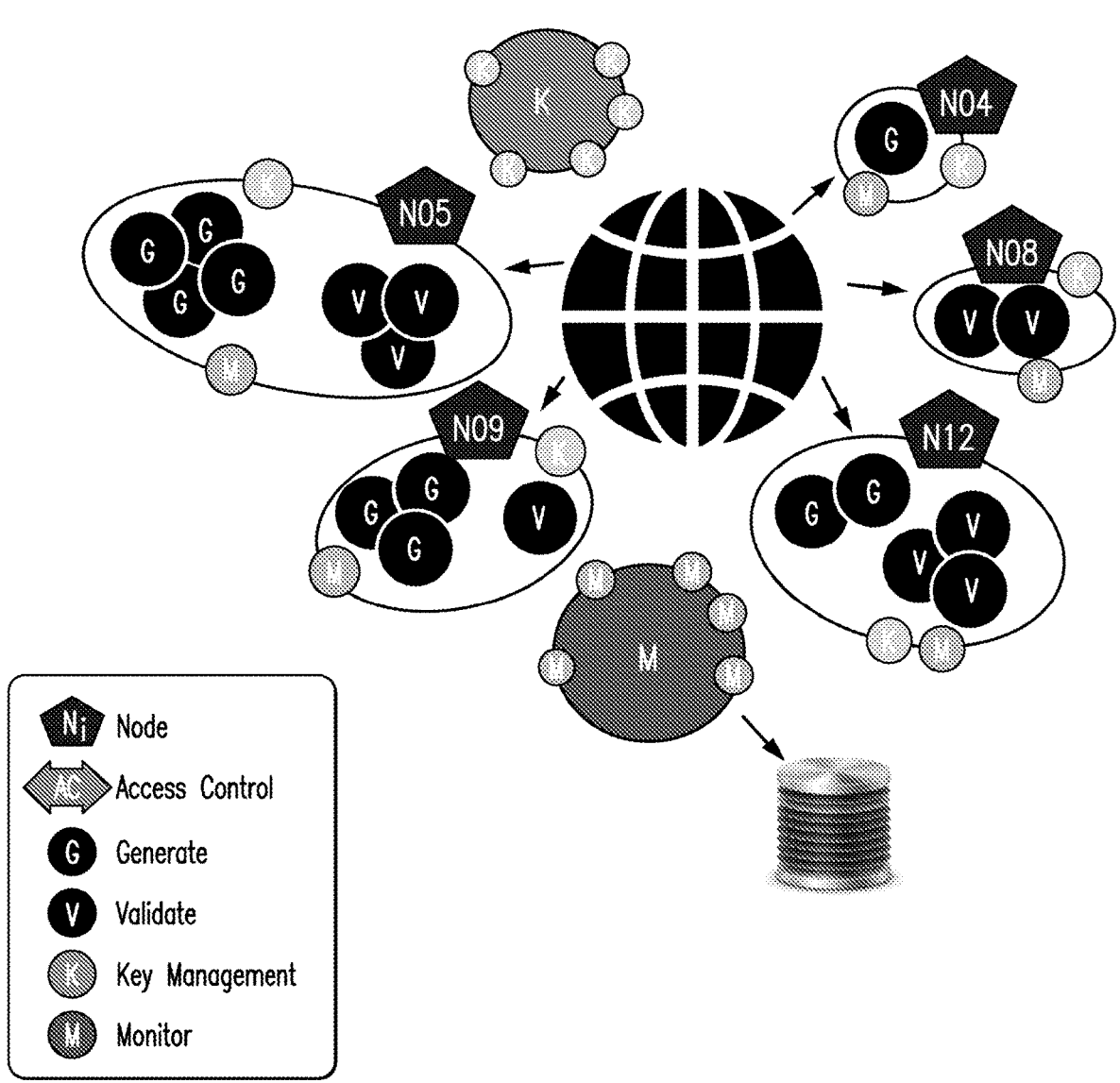
FIG. 8 illustrates schematically an arrangement for a distributed system for digital enablement of transactions.

FIG. 8 shows a decentralised system of computing nodes Nx, each capable of both generating G and validating V credentials. These credentials can be valid across the whole system (unless restricted to some nodes as result of on-soil regulation or the like), and in this case are associated with transactions for a set of users (clients) whose transactions are routed to that node, typically through geographic proximity. Nodes provide credential generation G and credential validation V as services to clients, and they need to be able to generate the credentials securely and validate them securely while they are valid at least. In the architecture shown, credentials are not stored—they are generated on request and validated on the fly. As FIGS. 8 and 9 show, in addition to credential generation and validation, key management K and monitoring M can be considered as services both locally at a node and across the system, and access control AC will typically be required to allow access to a service. These aspects will all be described in more detail below.

Elements of a suitable computing node are shown in FIG. 10. The node 80 comprises at least one networking connection 81 to allow communication to clients 90 and other nodes 91 as well as (in this example) a central node 91_a_. Communication is shown here as being through separate networks to each set of other parties—through a first network cloud 92 for connection to clients, and a second network cloud 92_a_ for connection to other nodes within the distributed system. This reflects that these networks may be physically different, or that they may have different security requirements and protocols.

The node 80 contains a plurality of conventional servers 83 (which will contain their own processors and memories—not shown—along with other components as would normally be found in a server) and a memory 84 containing a central database. Also comprised within the node 80 are a plurality of hardware security modules 85 (HSMs), adapted to hold cryptographic material in the form of keys needed to perform cryptographic functions and to perform cryptographic functions securely. Here elements within the node 80 are shown communicating by means of a bus 86. While the node 80 in this case is represented as a single data centre, this is not required—the "bus" may be, for example, comprise a dedicated network connection between a group of related data centres that allows them to provide a real-time response such that they will appear to other entities communicating with the node to be part of an integrated whole.

Existing procedures for credential management in payment systems are centralized—any request to create or validate credentials results in a query to a centralized system. For a payment system implementing EMV standards, credentials are generated using keys derived according to a hierarchical process. Issuer Master Keys (IMK) are associated with a specific range of tokens, and keys for use for credentials are derived hierarchically (Card Master Keys—CMK—from IMK, and then Session Keys—SK—from CMK). This approach is used for devices, such as physical cards, but is also used for digital transactions. The number of digital transactions is increasing extremely rapidly, as opposed to device-based interactions where the growth is more consistent with resources.

In the digital ecosystem, while there is very rapidly increasing demand, there is also generally a more secure environment, as the interaction is typically between merchant systems (or payment service providers) and the transaction system over secure pathways between well-identified participants. There are thus interactions that may require multiple cryptographic operations for security in a device context that can be streamlined when delivering services in a server context when exposing API to access the services while keeping all the assets secure in a constrained environment including key management and cryptographic operations.

While it may appear desirable to scale a transaction system for performing digital EMV transactions by using a set of distributed servers to generate and validate credentials, it is found that this approach does not scale. The overall level of key generation would not be changed, but the amount of messaging within the system would be very greatly increased, as an extremely large number of tokens would need to be managed and replicated. Processing would be demanding and also extremely expensive, as existing EMV key generation approaches require customised rather than off-the-shelf Hardware Security Modules (HSMs), and data storage and particularly network latency would become impossible to manage problems.

This distributed approach is supported by replacing the binding of a token to a specific hierarchically derived key, allowing instead the first available key from a stack of keys to be allocated to a tokenized transaction. This approach, using flexible and dynamic key management, allows for a scalable solution. Monitoring can be carried out in such a way as to ensure that the distributed architecture is secure without requiring the transmission or replication of large quantities of sensitive information. This approach can also be carried out in a standard HSM using fully FIPS compliant processes—for example, DES and 3DES need not be used. This approach is described in more detail below.

At present, the device security model is also used by the present applicant for fully digital transactions. This security model involves Issuer Master Keys (IMKs) being stored in the transaction system HSMs and used to derive Card Master Keys (CMKs) from the relevant IMK and a card PAN (Primary Account Number). These CMKs are then stored in a device (typically a Secure Element or substitute technology). When using software-based solutions to generate transaction credentials using a mobile device, a Session Key (SK) is generated using the relevant CMK and an ATC (Application Transaction Counter) for the card/device—this is currently generated by the Credentials Management System (CMS) as shown in FIG. 7. At present, all tokens, even for fully digital transactions, are bound to this IMK/CMK/SK derivation. This also applies for transaction credentials generated by server through API exposed by the transaction system for remote payment transactions.

This approach requires a very heavy management load for keys, which is not appropriate for fully digital transactions, as is discussed below with reference to FIGS. 11 and 12. Generation of SKs, and hence Application Cryptograms (AC—a standard mechanism in EMV transactions) requires multiple cryptographic operations, not all of which can be carried out by a conventional off the shelf HSM, so bespoke HSMs are required. Massive distribution of keys across the system is required so that performance of a transaction can be supported wherever it occurs, and ATC management is complex. It would be desirable to use standard HSMs, avoid massive key replication while having keys directly available for use, and to be able to provide a solution that limits the number of HSMs overall (as these typically support only a few thousand keys).

Much of this security is to provide assurance by appropriate prevention mechanisms even if there is the possibility of compromise at a system endpoint (for example, at the cardholder device). Aside from this, security has a limited role, as shown in FIG. 11. The main purpose of the cryptographic function is to provide a guarantee—this covers both integrity of the data and authentication. The transaction related data protected by a cryptographic data includes identification of a transaction and the associated token, along with an indication of any cryptographic processes used and any relevant financial data (along with any other aspect of the transaction that needs to be guaranteed). This is represented by a transaction credential—this needs to be generated G and subsequently validated V, with these processes being monitored M to ensure overall system integrity and supported by a key management system K of some kind. The present disclosure relates to an approach to monitoring which is effective to address the consequences of erroneous or malicious action by appropriate detection, messaging and reaction—as will be described, this largely takes place separately from the actual performance of a transaction.

In the case of a fully digital transaction, these processes take place in a constrained environment where endpoint security is not an issue in the same way as with devices. As can be seen from FIG. 12, in this domain the token does not reach either of the endpoints of the conventional transaction management system—the cardholder or the issuer. Instead, it operates across a merchant system or a payment service provider (PSP) and transaction scheme provider.

This approach allows for decentralisation of the credential system from a complex central server into a number of nodes providing services. These nodes will typically be geographically distributed but may extend over a number of data centres (for example, by use of a cloud infrastructure to achieve data sharing within a node). These nodes provide services—in relation to credentials, a generation service G and a validation service V—with defined rules for access control to the services. The merchant or PSP communicates with the generation service G to obtain credentials, which are then used in a standard authorisation process carried out over the payment network of the payment system, with the validating service V being called upon where necessary to validate the credential. These services have access to the computing infrastructure (HSMs, databases) of a node. Monitoring M and key management K services are also provided—these may be centrally organised or comprise a mix of central and local functionality.

Access control to services can be provided in an essentially conventional manner. A general set of controls can be defined for a node, with the possibility of local modification—for example, to meet local regulatory or other specific security requirements. This approach makes it easy to implement localised policies, for example, by constraining all traffic for a particular country to a particular set of nodes, or by taking other region- or market-specific actions. Access control can be performed at more than one level (for example, for individual services, but also for a node), and there may be specific rules or checks for specific service types. Access control is potentially very granular and may provide specific solutions in a versatile way—for example, it could be used to allow a given merchant to perform a maximum number of transaction credential generation operations during a defined time for a given token.

The key management mechanism shown in FIG. 13 illustrates how a limited number of keys can be allocated to a node while providing a deterministic process in order to pick a key to generate credentials. The same process can be used by a validation entity to determine the key that was used by the generator so that it can validate any cryptographic material that is part of the credentials submitted for validation.

For each node, the generation G and validation V services have access to a pool of HSMs. The HSMs contain keys that are each uniquely identified by a set of key identifiers (KeyId). KeyId may be a label, a value, an explicitly unique value such as a UUID, or anything else with appropriate properties. These KeyId values are stored in uniquely identified (Identifier) key lists—these key lists provide a list of relationships between an identifier (Id) and a stored key (KeyId). The identifiers (Id) are what will be determined by the deterministic process in order to establish what key is to be used, as will be described further below.

The integrity of each key list is guaranteed using a seal (Seal)—if the key lists are provisioned from a central location, this may be applied by a trusted party associated with that central location. Several other distribution models can be supported using for example a trusted party being a local functionality instead of a central location. A node will typically have a number of key lists available, but with only one active for generating credentials (G) at a given time—it will however generally be necessary for the validation service (V) to be able to access any key list that may be associated with a credential that is still valid. Key rotation in this approach is extremely straightforward—it may simply involve replacement of the active key list with another key list. It is however very straightforward to tell which KeyId is needed to validate a credential—it will be determined fully by the node identifier and the reference of the key list. That information is part of the credential and is used as input to the deterministic process to pick a key from a list of keys.

FIG. 13 illustrates an exemplary arrangement for Node Ni, which has two generation services G able to generate credentials associated with transactions. At any given point in time, these services G will be required to use a given key list—say Key List A in the first instance. This uses the yellow and blue keys, so these keys must be loaded in the HSMs used by the generation services G. After the expiry of a period of time, the key rotation process may for example mandate the use of Key List B—this uses yellow and blue keys, but also the green key, so the green key must be loaded in the relevant HSMs if not already present. The specific key to be used is selected from the key list by a deterministic process—this will typically give a different result after key rotation, but this is not inevitably the case (for example, Id=3 or Id=6 would give the blue key before or after rotation). While the generation services G do not need Key List A after key rotation, the validation services V still do—they require access to any key list that relates to a potentially valid credential. The validation services V must be able to establish exactly which key was used to generate a credential by the generation services G in order to validate a credential.

The transaction related data to be protected cryptographically includes identification of the token associated with the transaction, but also identification of the transaction itself. For this, some kind of transaction identifier is required. At each node, the credential generation and validation services have access to a local database which can be used to manage such data. To ensure that transactions are managed effectively across the system, any generation of transaction credentials for a given token should be associated with a unique transaction identifier for each transaction. This may be a UUID or any appropriate identifier structure (such as a concatenation of an n bit node identifier, an e bit epoch time, and a c bit local counter).

The size of data to be carried in transaction credentials could however be reduced to a few digits by use of a local transaction counter. This could simply be stored in the local database of a node and the local (rather than a global) value incremented when a local generation service G generates new transaction credentials for a token, a process shown in general terms in FIG. 14.

An exemplary process for identifying a key to use for a transaction will now be described with reference to FIG. 13. As indicated, at any given time a generation service G has access to a set of keys in local HSMs and uses keys in accordance with its currently active key list. This key list is itself uniquely identified (by Identifier) and contains a list of entries which correspond to relationships between an identifier (Id) and a stored key, represented by KeyId. In the case of Key List A, there are ten entries, and each Id is a single integer.

There will be a deterministic process associated with a key list to determine which key will be associated with a given transaction. It need not be the same deterministic process for every key list, but it needs to be used consistently for that key list so that both generation and validation services will achieve the same result. To provide this association, the deterministic process should operate on information identifying the transaction, such as some kind of transaction identifier—in this case, the local transaction counter (LTC) is a particularly effective choice as this is conveniently available and easy to process.

There are many choices available for a function, but the simplest choice is a MOD operation—for example here, Id=LTC MOD 10 would be appropriate to provide a deterministic result which could point to any of the available values of Id. Any validation service V with access to the transaction counter value in transaction data (or any counter derived from that value) can then determine the logical key identifier that was used by the generation service G that generated the credential and access the correct stored key without any trial and error mechanism. Associating the deterministic process function (referred to below as keyList.GetIdFunction, or GetId) to the attributes of a key list in this way allows a scalable solution that can accept any number of logical key identifiers for a given key list.

The HSM cryptographic function should be appropriate to ensure data integrity and authentication through credential generation and validation. The cryptographic function operates on the chosen transaction data, using the key, and provides an output which does not expose the key. Various alternative cryptographic functions could be used—HMAC is a particularly effective choice with several options regarding the hashing function, but CMAC, CBC MAC are among possible alternatives not even talking about solutions using asymmetric cryptography. The cryptographic function used should be specified in the key list (as keyList.CryptoFunction) and is also driven by the capabilities of the HSMs used for generation and validation. On-soil regulations, cryptographic material export or other security considerations may lead to the choice of specific cryptographic functions.

Within the transaction data, there should be information representative of the application cryptogram generated during the transaction process. This may be a educed form of the cryptogram—for example, in legacy EMV transactions this may be provided as the CVC2 field. This is significant as a validation service V must be able to access all the data used by a generation service G to generate a cryptogram—this will include the following:
  dynamic information carried as part of the transaction flow;
  shared information from one of the following:
    replicated processes (such as management of the key lists);
    system parameters for particular use cases.

Different approaches can be used for difference transaction information formats—legacy transaction, UCAF and DPD field transactions. Legacy transaction use cases provide a solution when the Merchant and/or the PSP are only able to manage PAN, Expiry Date and CVC2 as part of the transaction flow, and do not have access to more recent developments. The UCAF use case aims to leverage the Universal Cardholder Authentication Field to carry more data as part of the transaction flow. The DPD use case covers the recently introduced Digital Payment Data, a container able to carry all the data needed as part of the transaction flow. As is noted below, the additional capabilities of formats such as UCAF can support embodiments of the disclosure in providing additional capabilities.

A full set of cryptographic mechanisms is shown in FIG. 15. Key management is discussed with reference to FIG. 16. There are two aspects to key management in this model: management of the keys themselves, including their generation and delivery to the HSMs associated with the nodes, and management of the key lists, including their generation, distribution, activation and deactivation. The key lists are sensitive assets while keys are considered as secret assets—the key lists define the keys to be used for generation and validation of cryptograms. Keys require end to end security with secure transport of the keys using wrapping/unwrapping techniques when loading the keys in HSMs. Their use should not be compromised by the key lists in case an attacker would like to change the content of a key list in order to alter the key selection process. The integrity of key lists is guaranteed by the seals—a seal is provided for a key list by the generating party or an associated trusted party, will involve a suitable cryptographic process (such as HMAC with an appropriate dedicated key or using for example a digital signature generated using asymmetric algorithms such as RSA, ECC, SM2 . . . ), and has the effect that any relevant part of the system can have confidence that the key list was generated by an appropriate party and has not been modified. In addition, the key list seals can be used in the generation and validation of cryptograms to secure the credentials.

Different control models are possible. There may be centralized control, with a central service generating keys and key lists, and distributing these to the different nodes. There however also may be localised control if dedicated processes are required at a particular node. This may in particular apply if there are specific requirements for a particular country—for example, on-soil regulations or restrictions on export of cryptographic material. This may also apply if there is a proprietary mechanism needed for HSM management—for example, with a particular cloud service provider. This need not be node-limited—it could apply to regional control with a central service within a region (this may be particularly appropriate where there is a specific security model for a particular country to meet local legal requirements). There may also be a hybrid or composite model, in which some key and key list provisioning is central, whereas some is local—there may also be a distributed model in which distributed peers together assume the role of a central service.

Monitoring is shown in general terms in FIG. 17. Here, monitoring is complementary to security actions taken directly in a service to prevent fraud or misuse (such as the basic purpose of the service—generation of a credential using a cryptogram with subsequent validation). Such monitoring aims to detect security anomalies associated with a transaction—it can then trigger appropriate reaction mechanisms to contain any security risk and identify any attacker. In principle, this may have both local and central aspects. It is found that a hybrid approach is particularly effective in order both to provide effective detection of any issue and to produce reaction effective to counter risks associated with a fully distributed architecture.

There are three types of issue to be addressed by monitoring in such a system: integrity of the distributed system; generation of transaction credentials; and validation of transaction credentials. As transaction credentials may be generated or validated anywhere, it is important to have effective monitoring across the whole distributed system. An exemplary risk is that of misuse by an attacker of genuine transaction credentials generated by a generation service G in a node, in particular by an attempt to validate in multiple validation services in other nodes—this would be an issue if a validation service V did not have effective visibility of actions taken by validation services V in other nodes of the distributed system.

While monitoring is important to maintain the integrity of the system, it is also important to limit the amount of messaging that results to ensure that the system is scalable and will not be overloaded by the monitoring process. It is therefore desirable for messaging out of nodes to be limited to that genuinely necessary to address threats and for nodes to store information locally to allow effective use of the results of monitoring.

In embodiments of the disclosure, this approach is modified by adding an additional encryption layer to allow credentials to be protected over an extended period of time—additional transaction related information may also be included in a common encryption envelope with the credential. This extended period of time may be much longer than the period over which credentials can be validated after generation. This additional encryption layer allows transaction credentials to be stored securely and efficiently so that they and other transaction related information can be used in the future, for example to establish a linkage between a new transaction and a prior transaction (for example, in the processing of a refund, or a follow-on transaction after a pre-authorisation). When credentials are provided after generation, they may then be provided in a message containing an encrypted part and an unencrypted part. The encrypted part may contain the credential along with other sensitive transaction data. The unencrypted part may contain information that will allow the transaction to be identified and that will enable a node of the system to decrypt the encrypted envelope. An appropriate data format for providing such a message will be discussed further below.

To do this, in addition to providing credential generation G and credential validation V as services to clients, two more services are provided: encryption service E and decryption service D. Other features are essentially as before—again key management K and monitoring M can be considered as services both locally at a node and across the system, and access control (not shown) will typically be required to allow access to a service. Additional key management activity is required for the encryption and decryption service, but as discussed below the strategy for this will differ because of the different timescales involved.

As before, a node 80 may be provided as a single server or as a plurality of conventional servers (which will contain their own processors and memories—not shown—along with other components as would normally be found in a server). The node 80 has access to a plurality of hardware security modules 85 (HSMs), adapted to hold cryptographic material in the form of keys needed to perform cryptographic functions and to perform cryptographic functions securely, along with access to data storage 84.

The encryption service E is adapted to encrypt data including the credential after generation of the credential. As shown in FIG. 19, the decryption service D is used to decrypt such encrypted data to allow a credential to allow it to be validated, but also at a later time to allow transaction information to be used where necessary, typically where required by a further transaction. While validation of a credential will only be required once in performing a transaction, identification of and reference to transaction data elements may take place a number of times, so the keys used in the encryption and decryption process need to remain available for a long period of time. As will be described further below, encryption and decryption are not reliant on the validation process and decryption may be carried out many times after (and even before) validation. As can also be seen in FIG. 19, the credential generation G and validation V services have one set of keys, and the encryption E and decryption D services have another set of keys. As will be described further below, these may be rotated using a similar mechanic, but over a different timeframe.

The overall approach taken to key identification and use adopted in the generation of a credential (in this case, a cryptogram) can also be used for encryption too, but with a different set of keys that vary much more slowly. The approach to key selection used for generation is as generally set out earlier in this specification and summarised in FIG. 20. Transaction related data is established, including a local transaction counter (LTC) value established at the node. The LTC is used as the input to a function id, with function id being used to select a label. This label is associated with a key—keyid—in the relevant HSM. This key is used by the HSM to generate a cryptogram operating on relevant data (here, specific transaction data).

This approach can be used not only to select a key for generating the credential—the transaction key—but also to select a key for encryption of data—the encryption key. The same steps can be used—the local transaction counter can again be used to compute an encid function (which may even be the same id function as for credential generation—though could also be different in other embodiments), and this is used to select a key label. The key label here refers to a key from a different key list—an encryption key list, rather than a transaction key list. The key indicated by the label in the relevant HSM is used to encrypt the data itself.

While the same architecture is reused for each level of encryption, there are differences between the use of the transaction key list and the encryption key list. The transaction key list key references have a limited lifetime (for example, 24 hours) and are rotated regularly. As a result, the keys themselves are often changed. A transaction key list is identified by a combination of node identifier and transaction key list reference. The encryption key list key references will be chosen to have much longer lifetimes (possibly months or years). In the light of this long lifetime, an encryption key may be heavily used, but as a pseudo-random element is included as part of the data being encrypted using that key, any associated security risk in having numerous uses of the same encryption key for data protection is reduced. An encryption key list is identified by a combination of node identifier and encryption key list reference.

The encryption key list is a long-lived asset. It contains a key list identifier and a node identifier, and will have various properties indicating its provenance (timestamps for creation and activation and deactivation dates, format version information) and its use (identification of functions for crypto operation, isolation flag to indicate whether multiple nodes may be used for decryption) as well as the key labels themselves and an integrity maintaining key list seal.

Different algorithms will generally be used for generation/validation and for encryption/decryption. Generation and validation in embodiments above involve generating an output from a significant amount of data (and with possibly varying format)—a keyed-hash function will typically be appropriate here, and validation involves recreating the same hash and comparing it with the supplied value. For encryption/decryption, the original input needs to be recovered from encrypted data by the decryption process, so a block cipher is a logical choice.

The key list seal may thus in embodiments be used for a further purpose, as is shown in FIG. 21. If a block cipher is used for encryption—in the case shown, a block cipher in CBC mode is used—then an initialisation vector (IV) is needed for each encryption operation. A particularly effective choice is to define the IV using the key list seal—this is in this embodiment a 16-byte value, with 16 bytes of data also to be encrypted. The key list seal is a static value (used as a pseudo-random element) for a given key list, and the key is determined as described above with reference to FIG. 20. The process is followed in reverse for decryption. The relevant encryption key list is identified, revealing the key list seal, and the key is established for encryption in the same method as before. The decrypted data can therefore be re-established.

While a block cipher will typically be used for encryption and decryption here, different algorithm choices are possible. One possibility is to use a very broadly supported cipher such as AES, another choice is to use the SM4 block cipher, which may be preferred in a particular geography to address specific requirements about the choice of cryptographic primitives. In embodiments here, either choice can be made—this may be indicated by an appropriate reference in information associated with the transaction. For example, reference 3 can relate to AES, in which case the encryption and decryption processes may be identified as follows:

encryptCryptoXAes128Cbc( )
    decryptCryptoXAes128Cbc( )
    whereas reference 13 can relate to SM4 block cipher, in which case the encryption and decryption processes may be identified as follows:

encryptCryptoXSm4Cbc( )
    decryptCryptoXSm4Cbc( )
    In the same way, matching choices can be made for credential generation and validation, which would typically be carried out using a keyed-hash function as the output will be of a constrained size significantly smaller than the output. The functions referenced 3 and 13 may now be a SHA-256 keyed-hash and an SM3 keyed-hash respectively—for reference 3 the generation and validation processes are identified as follows:

generateCryptoXHmacSha256( )
    validateCryptoXHmacSha256( )
    whereas for reference 13 the generation and validation processes are identified as follows:

generateCryptoXHmacSm3( )
    validateCryptoXHmacSm3( )
    As discussed above, while the same approach to identification and selection of keys is used, the approach to key rotation differs significantly because of the different use cases—generation and validation requires a relatively rapid change (24 hour timescale) in keys but allows for significant key recycling, but encryption and decryption allows for much longer periods of key validity and it may be desirable to avoid key recycling altogether.

This may be achieved by using a longer key list reference for the encryption key list (say, 4 bits) rather than for the transaction key list (identified as 2 bits above), along with the much longer period of validity for the encryption key list rather than the transaction key list (months or years, rather than 24 hours). The transaction key list reference may therefore have up to four values and will cycle very regularly, while the transaction key list reference could have up to sixteen values and may never need to cycle at all.

As described in the applicant's earlier European Patent Application No. 19178579.9, recent versions of electronic transaction protocols can be used to carry more information than earlier protocols. Where the Universal Cardholder Authentication Field (UCAF) is available, a number of additional digits are usable. Using that approach, as shown in FIG. 22, a full local transaction counter value can be carried and more cryptographic material can be used—8 bytes of cryptogram, rather than 2 or 3 digits as with older protocols. A larger number of nodes can be used without node identification becoming a problematic issue because of limited available space in transaction data as defined in electronic transaction protocol requirements. It may also be possible to rotate key lists more frequently than 24 hours, as there is the space to use more than one bit for key list identification for validation services. Additional features can be delivered leveraging the available space in transaction data, for example by supporting merchant locking techniques (when the transaction is effectively bound to a given merchant using some form of merchant identification), by including additional components in the cryptographic process such as by using some pseudo-random element or variable content between the generator and the validator, or by taking additional measures to provide full compliance with any regulatory requirements.

As can be seen from FIG. 22, using an appropriate layout for the content of UCAF (e.g. Format 7) there are 21 bytes available. One byte can be split between a version identifier and a codebook to specify conditional data used in cryptogram generation. A full byte can be used to hold the Local Transaction Counter—this means that a generation service G will be able to generate up to 255 cryptograms per key list for a given node for a given token, which should prevent the need for a retry counter and address the need of transaction credentials before a new key list is activated. A further byte is sufficient for node identifier data and a key list reference, which leaves a full 10 bytes for conditional data to be used in cryptogram generation and/or validation—with each use case associated with a value in the codebook—allowing use of different data than that carried in the authorisation message (data carried can include an unpredictable number used for the transaction, merchant data such as merchant type and card acceptor or acquiring institution ID codes, amount related information . . . ). 8 bytes can be used for a truncated cryptogram, thus significantly increasing security. FIG. 23 indicates how the cryptographic processes can then operate—the PAN, LTC, Node Identifier and Reference can all easily be included, and additional information can be provided in the encrypted data, such as additional transaction fields, the codebook and other conditional data.

In an embodiment of the disclosure, a new structure of UCAF can be used, using a new format, UCAF Format 8. This is shown in FIG. 24. This comprises an encrypted part 241 and an unencrypted part 242. The encrypted part 241 contains the credential (the cryptogram) and also certain transaction data, which allows certain elements to be held only in encrypted form. The unencrypted part 242 allows the transaction and its provenance to be identified. This is described in more detail below.

The unencrypted part 242 contains 4 bytes of information that establishes the version, the node (and information related to the node), the transaction and certain merchant information. Version information 2411 is a 4-bit field allowing multiple versions of the format to be used. Information relating to the node includes a 6-bit node identifier 2412, and the key list references associated with the node—as indicated previously, these include a 2-bit transaction key list reference 2413 and a 4-bit encryption key list reference 2414. The transaction itself is identified by 1-byte of Local Transaction Counter (LTC) 2415. As described above, this information is sufficient to allow a node to perform validation (if permitted to do so) by regenerating the credential/cryptogram. Merchant binding to the token is provided by a Merchant ID Hash divided between a 1-byte unencrypted part 2416 and a 1-byte encrypted part 2421.

Use of encryption allows other transaction information to be held in encrypted form, but available in the future after decryption so that a transaction may be mapped to a PAN (Primary Account Number) without the need for maintaining a specific mapping database—other significant information such as PAN Sequence Number (PSN) can be held in this way. The encrypted data 242 comprises 16 bytes of data, the first byte of which is the encrypted part 2421 of the Merchant ID Hash as identified above. The cryptogram 2422 forms the next 22 bits of the encrypted data. One bit is used as an SCA Flag 2423 to indicate whether Strong Customer Authentication is used for the transaction. A further 23 bits are used for approximate transaction amount 2424—these can be coded in the form $$\text{Reconstructed Amount} = A * 2^B$$

where A is used for the leftmost 18 bits and B for the rightmost 5 bits. The next 74 bits relate to card information 2425. This includes the PAN (63 bits) and the PSN (4 bits) which can be provided in full. 7 bits are used to carry expiry date information—this therefore needs to be a partial expiry date, which can be obtained as follows:

The standard Expiry Date is coded using 4 digits—YYMM

Constraints on the digits allow this to be coded in 11 bits (normally in the format MMYY) by using MM-1 (i.e. January=00, February=01, . . . December=11)

followed by YY using values between 0000 and 1199 (00000000000b and 10010101111b)

This can be shortened to 7 bits by ignoring the first year digit and reconstructing it MM-1 is used as before Only $\underline{Y}$ of Y$\underline{Y}$ is used using values between 000 and 119 (0000000b and 1110111b)

recipient can use $\underline{Y}$ to determine Y of Y$\underline{Y}$MM to reconstruct the full Expiry Date In this way, transaction information can be provided effectively to contain critical information in an encrypted form. This approach is highly beneficial, as it supports the binding between a token and its corresponding PAN without using a standard mapping service—the use of such a mapping service with extremely high transaction volumes would provide a significant computing and storage burden. This transaction information can also be used as a way to check decrypted data without validation of the cryptogram, as will be described further below.

Specific processes for generation (and validation) of credentials using approaches described above will now be described in more detail.

Generation of a cryptogram here involves producing 22 bits from transaction data using a keyed-hash function—two hashing options are presented, SHA-256 and SM3. Exemplary processes for each are as follows:

3: generateCryptoXHmacSha256( )

Generate 22 bits cryptogram as follows:

1. Create JSON object compliant with Crypto (input) schema

2. Prepare input data using JSON content (ASCII) converted to hex format with removal of all the fillers and delimiters 3. Generate MAC over input data according to ISO/TEC 9797-2 MAC Algorithm 2 (HMAC) using SHA256 (ISO/IEC 10118-3) with truncation done to 16 bytes (leftmost)

4. Take leftmost 22 bits of result and use as response.

13: generateCryptoXHmacSm3( )

Generate 22 bits cryptogram as follows:

1. Create JSON object compliant with Crypto (input) schema

2. Prepare input data using JSON content (ASCII) converted to hex format with removal of all the fillers and delimiters 3. Generate MAC over input data according to ISO/TEC 9797-2 MAC Algorithm 2 (HMAC) using SM3 (ISO/IEC 10118-3) with truncation done to 16 bytes (leftmost)

4. Take leftmost 22 bits of result and use as response.

Validation processes are complementary to the generation processes.

3: validateCryptoXHmacSha256( )

Validate 22 bits cryptogram as follows:

1. Create JSON object compliant with Crypto (input) schema

2. Prepare input data using JSON content (ASCII) converted to hex format with removal of all the fillers and delimiters 3. Generate MAC over input data according to ISO/IEC 9797-2 MAC Algorithm 2 (HMAC) using SHA256 (ISO/IEC 10118-3) with truncation done to 16 bytes (leftmost)

4. Take leftmost 22 bits of result and use as generated value

5. Compare generated value against value supplied for validation

6. Set response to true or false based on comparison outcome.

13: validateCryptoXHmacSm3( )

Validate 22 bits cryptogram as follows:

1. Create JSON object compliant with Crypto (input) schema

2. Prepare input data using JSON content (ASCII) converted to hex format with removal of all the fillers and delimiters 3. Generate MAC over input data according to ISO/IEC 9797-2 MAC Algorithm 2 (HMAC) using SM3 (ISO/IEC 10118-3) with truncation done to 16 bytes (leftmost)

4. Take leftmost 22 bits of result and use as generated value

5. Compare generated value against value supplied for validation

6. Set response to true or false based on comparison outcome

As noted above, data in the encrypted part can be used for checking to provide confidence, for example, that a later transaction relates to an earlier transaction without validation of a cryptogram. The use of credential generation and validation of a transaction is described with reference to FIG. 25, and FIGS. 26 and 27 show how embodiments of the disclosure can be used to provide assurance about other transaction elements when validation of a credential has not taken place or may no longer be possible.

For performance of a transaction with generation and validation of a credential, the process is as shown in FIG. 25. The transaction is performed by a merchant, or by a payment service provider (PSP) on the merchant's behalf. The transaction is digitized, and so uses the architecture shown here for performance. Associated with the transaction, there will generally be a Primary Account Number (PAN) for the customer, but a digitized transaction will typically be tokenized, and the account PAN will be replaced by a token unique reference (TUR) and its associated surrogate PAN value. The token will be mapped on to an account as represented by a PAN and PSN at least.

Once the transaction details are established, the merchant or PSP will call the transaction infrastructure (here the system of multiple service providing nodes is termed NODES—this term is used below) for generation of transaction credentials. The token and its mapping information, along with the transaction data, are provided to a node and hence to a generation service to generate a credential. This credential is then encrypted along with other transaction data to form an encrypted part, and transaction information containing this encrypted part is provided along with certain unencrypted transaction information in the UCAF 8 data format described above. As noted in FIG. 25, the token itself is used in the generation of a cryptogram, whereas the generated cryptogram (cryptographically associated to the token) and information to establish of the mapping of the token to account data such as PAN and PSN are in the encrypted part. The UCAF 8 format transaction data is returned to the merchant/PSP.

The merchant or PSP can store this UCAF 8 format information (including the cryptogram (associated to the token) and the encrypted mapping information). In doing so, the merchant/PSP will not thereby be storing the account information of the consumer in clear—such account information is only held in an encrypted form. When the transaction is now submitted online for processing by the merchant/PSP, it needs to be validated by the payment scheme provider (such as the present applicant). Again, a NODES service is called to carry out this validation, by first using unencrypted information to establish the decryption key and then by using this decryption key to decrypt the encrypted part of the UCAF 8 information. This decryption reveals the credential, and it can be seen that by using approaches as indicated above sufficient information is available to allow the credential to be validated.

While this completes the transaction process, it is apparent from FIG. that the merchant/PSP can still call the decryption service to obtain access to encrypted information—this may typically be the mapping information for the token for use in connection with a related transaction.

At the validation stage, the merchant/PSP can use the outcome of the validation process as a confirmation of integrity of the mapping information stored alongside it in the encrypted part of the UCAF 8 data. This validation process can only take place once, and it can only be carried out as long the associated transaction key list is still active. As noted above, it would be desirable to be able to establish the integrity of mapping information independently of the validation process, for example for follow-on transactions—it may even be desirable to do this before validation has taken place in some circumstances.

As can be seen from FIG. 24, there is additional information available to check decrypted data without validation of the cryptogram: the Merchant ID Hash (split between the unencrypted part and the encrypted part); the SCA flag; and the approximate amount of the transaction. The Merchant ID, SCA Flag and Approximate Amount together form a part of the overall transaction data, here termed "partial transaction data". If the merchant/PSP itself stores the partial transaction data at the time of the transaction, then when it calls the decrypt service to get mapping information from the UCAF 8 data, it can include the partial transaction information in the call. The decrypt service can then compute the Merchant ID Hash from the Merchant ID and the Approximate Amount from the call and the LTC (determinable from the unencrypted amount of the UCAF 8 data), decrypt the encrypted data, and check the Merchant ID Hash, SCA Flag and Approximate Amount derived or partially derived from the UCAF 8 encrypted data against computed and supplied information to return mapping information with a confirmation of integrity (or an error if the check fails).

This process does not depend on validation in any way, and it can therefore take place before or after (even long after) validation has taken place. FIG. 26 indicates a case where decryption takes place before validation—all that is necessary is that the credential has been generated and the UCAF 8 data created, and that this has been stored along with the partial transaction data by the merchant/PSP.

FIG. 27 indicates in more detail the process for a "follow-on" transaction. At this point, the relevant transaction has already been validated, so the encrypted part is only protecting the mapping information—the merchant however has the information for the "old" transaction and the associated "old" UCAF 8 data. This can however be used to decrypt the encrypted part of the old UCAF 8 data to reveal the mapping information, and this mapping information can be applied to a "new" transaction if the intention is for this to be a follow-on transaction to the "old" transaction. Account details are used for the new transaction along with any new elements to transaction data—this results in new UCAF 8 data, in which the mapping data will again be encrypted.

As the skilled person will appreciate, the embodiments described above are exemplary, and further embodiments falling within the spirit and scope of the disclosure may be developed by the skilled person working from the principles and examples set out above. In particular, the embodiments described in detail above relate particularly to the generation and validation of credentials, and the encryption and decryption of those credentials with other data, where both the credentials and the other data are used in financial transactions. Generation and validation of credentials, and encryption of credentials with other data, in this way is not limited to financial transactions—this approach may be used in any distributed system where it is necessary for one party to confirm that a legitimate action has been taken by another party, where the two parties may be accessing different nodes of the distributed system.

The invention claimed is:

1. A method of providing a secure service at a computing node for a requesting party external to the computing node, the method comprising at the computing node:

receiving a service request from the requesting party, wherein the service request comprises a request to generate a credential;

generating the credential;

obtaining service-related information, and encrypting the credential and the service-related information using an encryption process to form an encrypted message part;

creating a service-identifying clear message part, wherein the clear message part is an unencrypted message part, wherein the unencrypted message part includes a node identifier identifying a node and a key list reference associated with the node, wherein an encryption key list to decrypt the encrypted message part is associated with the key list reference and the node identifier; and sending a message comprising the clear message part and the encrypted message part to the requesting party.

2. The method of claim 1, wherein the encryption process comprises a block cipher.

3. The method of claim 1, wherein the credential is generated using a cryptographic process.

4. The method of claim 3, wherein a shared mechanism is used for providing keys for the encryption process and the cryptographic process.

5. The method of claim 4, wherein a key validity period for keys for the encryption process is longer than a key validity period for keys for the cryptographic process.

6. The method of claim 3, wherein the cryptographic process comprises a keyed-hash algorithm.

7. The method of claim 1, wherein the secure service comprises providing a credential for a transaction to allow the transaction to be authorized if the credential is validated.

8. The method of claim 7, wherein the unencrypted message part comprises information to identify how to process the transaction.

9. The method of claim 8, wherein the encrypted message part comprises transaction data as well as the credential.

10. The method of claim 9, wherein the transaction data comprises account data and transaction details, wherein the transaction details are adapted for checking the validity of account data independently of validation of the credential.

11. The method of claim 10, wherein the account data comprises at least a primary account number and an indication of an expiry date, and wherein the transaction details comprise one or more of a merchant identifier, a transaction amount, and a strong customer authentication flag.

12. A method of providing a secure service at a computing node for a requesting party external to the computing node, the method comprising at the computing node:

receiving a service request from the requesting party, wherein the service request comprises a request to validate a credential, wherein the service request comprises a message comprising the credential, wherein the message comprises a clear message part comprising service-identifying information and an encrypted part comprising the credential and service-related information, wherein the clear message part is an unencrypted message part;

using the service-identifying information to perform a decryption process to decrypt the encrypted part of the message by identifying a node identifier identifying a node and a key list reference associated with the node from the unencrypted message part, wherein an encryption key list to decrypt the encrypted part is associated with the key list reference and the node identifier; and further using the service-identifying information to validate the credential.

13. The method of claim 12, wherein the decryption process comprises a block cipher.

14. The method of claim 12, wherein the credential is generated using a cryptographic process.

15. The method of claim 14, wherein the cryptographic process comprises a keyed-hash algorithm.

16. The method of claim 12, wherein the secure service comprises validating a credential for a transaction to allow the transaction to be authorized.

17. The method of claim 16, wherein the unencrypted message part comprises information to identify how to process the transaction.

18. A method of providing a secure service at a computing node for a requesting party external to the computing node, the method comprising at the computing node:

receiving a service request from a requesting party, wherein the service request comprises a request to confirm integrity of service-related information and a message, wherein the message comprises a clear message part comprising service-identifying information and an encrypted part comprising service-related information, wherein the clear message part is an unencrypted message part;

using the service-identifying information to perform a decryption process to decrypt the encrypted part of the message to provide the service-related information by identifying a node identifier identifying a node and a key list reference associated with the node from the unencrypted message part, wherein an encryption key list to decrypt the encrypted part is associated with the key list reference and the node identifier; and further using a first part of the service-related information to confirm the integrity of a second part of the service-related information, wherein the first part of the service-related information is provided in the service request.

19. The method of claim 18, wherein the decryption process comprises a block cipher.

20. The method of claim 18, wherein the secure service comprises providing transaction-related data to a party entitled to receive the transaction-related data.

* * * * *